(12) United States Patent
Yamamura et al.

(10) Patent No.: US 7,322,606 B2
(45) Date of Patent: Jan. 29, 2008

(54) OCCUPANT PROTECTION APPARATUS

(75) Inventors: Daisuke Yamamura, Aichi-ken (JP);
Michio Inoue, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/591,495

(22) Filed: Nov. 2, 2006

(65) Prior Publication Data
US 2007/0102126 A1   May 10, 2007

(30) Foreign Application Priority Data

Nov. 7, 2005 (JP) ............................. 2005-322207
Feb. 17, 2006 (JP) ............................. 2006-041232

(51) Int. Cl.
*B60R 21/02* (2006.01)
(52) U.S. Cl. .................... 280/748; 280/730.2; 280/749
(58) Field of Classification Search ............... 280/748, 280/749, 730.2
See application file for complete search history.

(56) References Cited

U.S. PATENT DOCUMENTS

| | | | | |
|---|---|---|---|---|
| 5,462,308 A * | 10/1995 | Seki et al. | .................. | 280/749 |
| 5,865,462 A * | 2/1999 | Robins et al. | ............ | 280/730.2 |
| 6,000,715 A * | 12/1999 | Tschaeschke | ............ | 280/730.2 |
| 6,135,497 A * | 10/2000 | Sutherland et al. | ......... | 280/749 |
| 6,375,216 B1 * | 4/2002 | Eschbach | ................. | 280/730.1 |
| 6,508,487 B2 * | 1/2003 | Koster | ..................... | 280/730.2 |
| 6,773,031 B2 * | 8/2004 | Haig | ........................... | 280/749 |
| 6,773,054 B2 * | 8/2004 | Martini | ....................... | 296/148 |
| 6,893,045 B2 * | 5/2005 | Inoue et al. | ................. | 280/753 |
| 6,986,528 B2 * | 1/2006 | Inoue et al. | ............. | 280/730.2 |
| 7,125,039 B2 * | 10/2006 | Bossecker et al. | ....... | 280/730.2 |
| 7,165,783 B2 * | 1/2007 | Karlbauer et al. | ....... | 280/730.2 |
| 2003/0107209 A1 * | 6/2003 | Haig | .......................... | 280/749 |

FOREIGN PATENT DOCUMENTS

JP   A-2002-19572   1/2002

* cited by examiner

*Primary Examiner*—Paul N. Dickson
*Assistant Examiner*—Toan To
(74) *Attorney, Agent, or Firm*—Posz Law Group, PLC

(57) ABSTRACT

An occupant protection apparatus includes a cover sheet adapted to be fed out from a peripheral edge of a window of a vehicle, when a pulling unit is activated, so as to cover the window. The pulling unit includes a pulling string having flexibility and a pulling device to which the pulling string is connected so as to be pulled thereby and which is disposed below the window. When the pulling device is activated, the pulling string is pulled such that a portion thereof which extends from a fixed end to where it is supported by a support member becomes a straight line while a portion thereof which is disposed along a lower edge portion of the peripheral edge of the window is caused to rise. The cover sheet includes a passageway portion through which the pulling string is passed on an upper side part thereof and is folded to be accommodated in the window only along the lower edge side of the peripheral edge thereof with the portion of the pulling string which has not yet been activated inserted into the passageway portion so as to be staying therein.

7 Claims, 25 Drawing Sheets

OCCUPANT PROTECTION APPARATUS

BACKGROUND OF THE INVENTION

1. Related Art

The present invention relates to an occupant protection apparatus in which a cover sheet is fed out of a peripheral edge of a window of a vehicle, when activated, so as to prevent an occupant from being ejected from the window of the vehicle when the vehicle rolls over (overturns).

2. Related Art

As a conventional occupant protection apparatus, there exists an occupant protection apparatus in which a cover sheet is folded to be accommodated in a peripheral edge of a window of a vehicle such that the cover sheet is fed out thereof so as to cover the window when a pulling unit is activated to operate (for example, refer to JP-A-2002-19572).

In this occupant protection apparatus, the pulling unit is provided with a pulling string which is connected to the cover sheet and a pulling device which pulls the pulling string. In addition, the pulling string extends downward from a fixed point on a front side of the window peripheral edge to be accommodated in a lower edge portion of the window peripheral edge, furthermore, rises along a rear side of the window peripheral edge to be wound round a free roller so as to reverse its pulling direction, and is connected to a pulling device provided below the window.

In this occupant protection apparatus, when the system is activated, when the pulling device pulls the pulling string, the cover sheet connected to the pulling string rises from the lower edge portion of the window peripheral edge and deploys to cover almost a lower half of the window. In addition, in this occupant protection apparatus, even in the event that the head or the like of the occupant rests on the lower edge portion of the window peripheral edge when the cover sheet deploys, the relevant portion of the occupant is caused to erect to return to an inward position inside a passenger compartment, so that the cover sheet is allowed to cover the window.

In the conventional occupant protection apparatus, however, since the cover sheet is connected to the pulling string along a whole area of an upper side thereof, in the event that the cover sheet is made to cover substantially the whole area of the window from the lower edge portion to an upper edge portion thereof, the fixed point of the pulling string which is far apart from the pulling device is disposed at an upper end of the front edge of the window peripheral edge, and the free roller is disposed at an upper end of the rear edge of the window peripheral edge. The pulling string is made to extend downward from the upper end on the front side of the window peripheral edge to be accommodated on the lower edge portion of the window peripheral edge, furthermore, is made to rise along the rear side of the window peripheral edge to be wound round the free roller disposed at the upper end on the rear side of the window peripheral edge so as to reverse its pulling direction, and is connected to the pulling device. Then, when it completes its deployment, a front end side of the upper side of the cover sheet comes to be connected to a portion of the pulling string which lies in the vicinity of the fixed point thereof. Due to this, a case is called for where the cover sheet is accommodated on the front side of the window peripheral edge when it is installed on the vehicle.

However, the front and rear edges of the window peripheral edge constitute areas where a space for accommodation or installation of the cover sheet is difficult to be secured, and in particular, in a door such as a front side door or rear side door, the securing of the space gets more difficult, and hence, it has been desired that the cover sheet is accommodated on the lower edge portion of the window peripheral edge where the accommodation space is easy to be secured.

SUMMARY OF THE INVENTION

The invention was made with a view to solving the problem and an object thereof is to provide an occupant protection apparatus in which the cover sheet can be accommodated only on the lower edge portion of the window peripheral edge even in the event that the cover sheet is made to cover the whole area of the window from the lower edge to the upper edge of the window peripheral edge.

According to the invention, there is provided an occupant protection apparatus adapted to cover a window in a vehicle, comprising:

a window peripheral edge including an upper edge portion and a lower edge portion, the window being defined between the lower edge portion and the upper edge portion of the window peripheral edge;

a cover sheet having an upper side part and a lower side part, for covering almost a whole area of the window, wherein the cover sheet is accommodated in the lower edge portion of the window peripheral edge such that the lower side part of the cover sheet as a stationary side is fixed substantially entirely along the lower edge portion of the window peripheral edge, and the upper side part of the cover sheet as a moving side to be pulled is located adjacent to the lower side part by folding the cover sheet; and a pulling unit including a pulling string having flexibility and a pulling device disposed below the window to pull the pulling string, wherein one end of the pulling string as a fixed end is fixed to a first side upper end portion of the window peripheral edge located on one of a front and rear sides of the window, another end of the pulling string as a proximal end is led to the pulling device through the lower edge portion of the window peripheral edge and a second upper end portion of the window peripheral edge located on the other of the front and rear sides of the window peripheral edge, and the pulling string is slidably guided around a support member provided at the second upper end portion of the window peripheral edge to reverse a pulling direction of the pulling string;

wherein when the pulling unit is activated, the pulling string is pulled to the pulling device to be linearly led between the first upper end portion and the second upper end portion, whereby the pulling string lifts the moving side of the cover sheet from the lower edge portion of the window peripheral edge top spread the cover sheet from the lower edge portion of the window to cover the window;

wherein the cover sheet includes a passageway portion through which the pulling string is slidably inserted in a vicinity of a front side and a rear side of the upper side part of the cover sheet, the passageway portion is accommodated before the pulling string is activated.

In the occupant protection apparatus according to the invention, when the system is activated, in the event that the pulling devices pulls the pulling string, the pulling string is pulled such that the portion thereof which is disposed on the lower edge portion of the window peripheral edge is caused to rise. As this occurs, the cover sheet has the passageway portion which is provided on at least the portions of the upper side part which lie in the vicinity of the front end and the rear end thereof for passage of the pulling string, and the pulling string passes through the passageway portions to pull up the passageway portions. Due to this, the cover sheet is pulled up on the upper side part thereof to complete its deployment which started from its folded and accommodated state when the portion of the pulling string which extends from the fixed end to the portion supported by the support member becomes a straight line, whereby the cover sheet is allowed to cover almost the whole area of the window from the lower edge to the upper edge thereof by the area thereof which extends from the lower side part which is connected to the lower edge portion of the window peripheral edge to the upper side part thereof.

Namely, even in the event that the cover sheet is accommodated only on the lower edge portion of the window peripheral edge, the cover sheet is pulled by the pulling string which passes through the passageway portions so as to rise in a smooth fashion to cover almost the whole area of the window from the lower edge portion to the upper edge portion of the window peripheral edge.

Consequently, in the occupant protection apparatus according to the invention, even in the event that the cover sheet is made to cover almost the whole area of the window from the lower edge to the upper edge of the peripheral edge thereof, the cover sheet can be accommodated in the window only on the lower edge portion of the peripheral edge thereof. In addition, in case only spaces for accommodating the pulling string and the support member can be secured in the front and rear edges of the window peripheral edge, the folded cover sheet and the pulling device can be disposed below the window where ample space is secured. Thus, the occupant protection apparatus according to the invention can easily be installed on the door where the accommodation space is limited.

In addition, it is desirable that the upper side part of the cover sheet is formed into a tubular shape over a whole area from a front end to a rear end thereof, so as to constitute the passageway portion. In this configuration, compared to the case where the passageway portion is provided partially on the upper side part of the cover sheet in an intermittent fashion, the whole area of the part of the window which lies in the vicinity of the upper edge of the window can be covered by the upper side part of the cover sheet with no gap. Namely, in the case where the passageway portion is provided partially on the upper side part of the cover sheet in the intermittent fashion, when the deployment of the cover sheet is completed, there is produced a portion on the upper side part of the cover sheet which is partially pulled toward the lower side part thereof between the passageway portions, and the portion is pulled downward so as to be held apart from the pulling string, resulting in a risk where a space is produced in the cover sheet which uncovers the window. In contrast to this, in the event that the whole area of the upper side part of the cover sheet is made to constitute the passageway portion, there is caused no risk where the portion is produced which is held apart from the pulling string.

Additionally, a stopper mechanism may be provided on the portion of the upper side part of the cover sheet where the passageway portion lying toward the support member is provided and the pulling string such that constituent parts of the mechanism are brought into engagement with each other so as to prevent the portion of the upper side part of the cover sheet where the relevant passageway portion is provided from returning back toward the fixed end of the pulling material when the cover sheet is completely deployed.

In the configuration like this, when the deployment of the cover sheet is completed, the portion of the upper side part of the cover sheet where the passageway portion lying toward the support member is provided is pulled toward the support member by the stopper mechanism, and the cover sheet which has completely deployed prevents the movement of the edge thereof which lies toward the support member toward the center of the window, whereby the reduction in area of the cover sheet which covers the window can be suppressed when and after the cover sheet has completely deployed to hold the occupant.

In this case, the height of the fixed end of the pulling string and the support member is desirably set such that a portion of the pulling string which extends from the fixed end to the support member is kept farther away from the lower edge portion of the window peripheral edge at a support member end than at the fixed end thereof when the cover sheet is completely deployed, and the cover sheet is desirably set such that the upper side part moves away from the lower side part thereof so as to correspond to the height-wise positions of the fixed end of the pulling string and the support member so set.

In the configuration like this, when the cover sheet has completely deployed, since the end portion of the upper side part thereof which lies far apart from the support member is positioned lower in height than the end portion which lies toward the support member, the cover sheet is made difficult to rise. Namely, the end portion of the upper side part of the cover sheet which lies far apart from the support member is made difficult to approach the support member, and in conjunction with the configuration where the end portion of the upper side part of the cover sheet which lies toward the support member is controlled with respect to its position by the stopper mechanism so as not to move apart from the support member, the front and rear edges of the cover sheet themselves are prevented from moving toward the center of the window, whereby the reduction in area of the cover sheet which covers the window can be suppressed further when and after the cover sheet has completely deployed to hold the occupant.

In addition, when a stopper mechanism is provided between the cover sheet and the pulling string, apart from the aforesaid first stopper mechanism which is provided between the passageway portion on the upper side part of the cover sheet which lies toward the support member, a secondary stopper mechanism may be provided further on the portion of the upper side part of the cover sheet where the passageway portion lying toward the fixed end of the pulling string is provided and the pulling string such that constituent parts of the secondary mechanism are brought into engagement with each other so as to prevent the portion of the upper side part of the cover sheet where the relevant passageway portion is provided from moving toward the support member when the cover sheet is completely deployed.

In the configuration like this, the end portion of the upper side part of the cover sheet which lies far apart from the support member is made difficult to approach the support member by the secondary stopper mechanism, and in conjunction with the configuration where the end portion of the upper side part of the cover sheet which lies toward the support member is controlled with respect to its position by the first stopper mechanism so as not to move apart from the support member, both the front and rear edges of the cover sheet themselves are prevented from moving toward the center of the window, whereby the reduction in area of the cover sheet which covers the window can be suppressed further when and after the cover sheet has completely deployed to hold the occupant.

Furthermore, in the occupant protection apparatus according to the invention, a substantially vertically extending rod-like guide rail is provided on at least either of the front and rear sides of the window peripheral edge, and a locking portion may be provided on the cover sheet on either of front and rear edges thereof which corresponds to the guide rail when the cover sheet covers the window so as to slidably lock on to the guide rail so as to restrict the movement of the cover sheet toward a center of the window when the cover sheet covers the window.

In the configuration like this, when the cover sheet has completely deployed, at least either of the front and rear edges thereof is made to be locked on to the guide rail by using the locking portion so formed so as to control the movement of the relevant edge toward the center of the window, whereby the reduction in area of the cover sheet which covers the window can be suppressed when and after the cover sheet has completely deployed to hold the occupant. When the cover sheet deploys from the folded state, since the cover sheet can slide and rise along the guide rail, the cover sheet can, of course, complete its deployment without any problem.

In addition, provided that the guide rail is provided so as to extend vertically, in addition to the configuration where the guide rail is provided with the rod having rigidity which is disposed on either the front edge or the rear edge of the window peripheral edge, the guide rail may be provided with a portion of the pulling string itself which extends from the support member where the pulling string reverses its pulling direction toward the pulling device. In the event that the guide rail is provided with the pulling string itself, compared to the case where the rod is provided separately, the number of components involved can be reduce by such an extent that the rod is not used. Incidentally, while the pulling string has flexibility, since the portion of the pulling string which extends from the support member where its pulling direction is reversed toward the pulling device produces tension when pulled, the relevant portion becomes a rod-like member having rigidity, and therefore, the portion of the pulling string can guide the locking portion and control the movement of the locking portion toward the center of the window substantially in the same manner as done by a metal rod or the like.

DETAILED DESCRIPTION OF THE PREFERRED EMBODIMENTS

Figure 1:
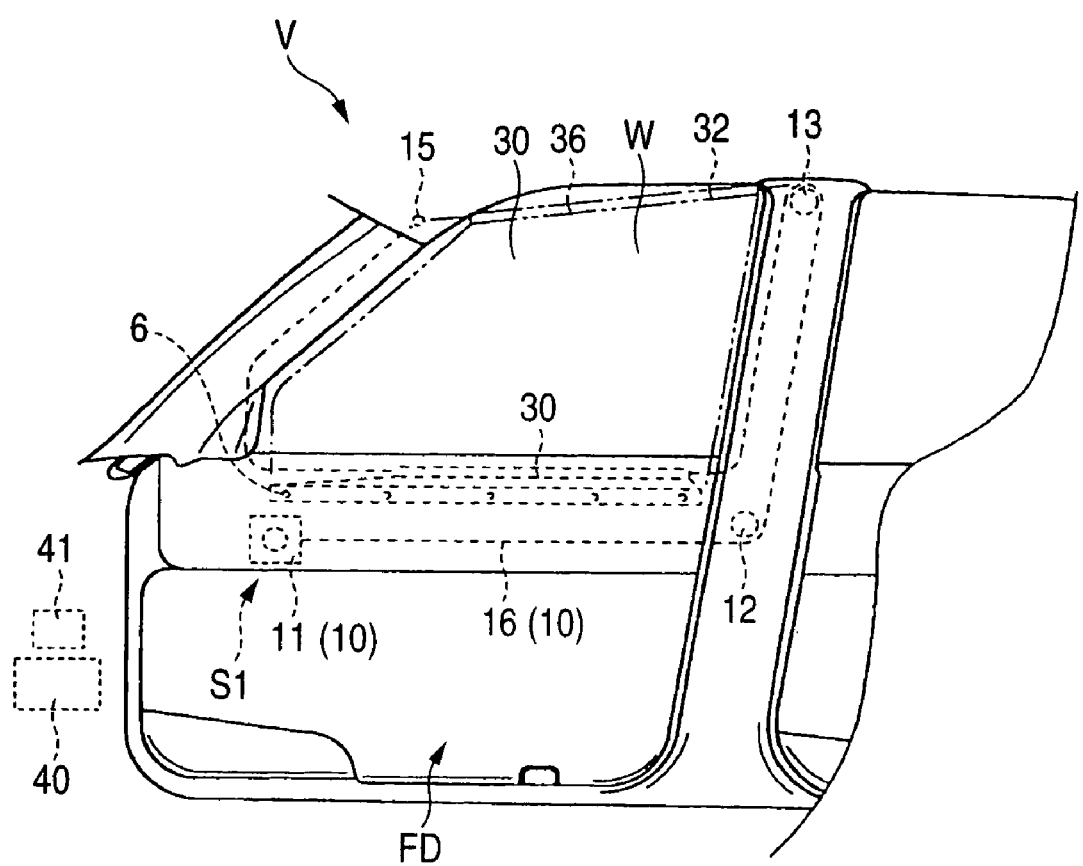
FIG. 1 is a view resulting when seen from the inside of a vehicle which shows a state in which an occupant protection apparatus of a first embodiment according to the invention is installed on the vehicle.
Figure 2:
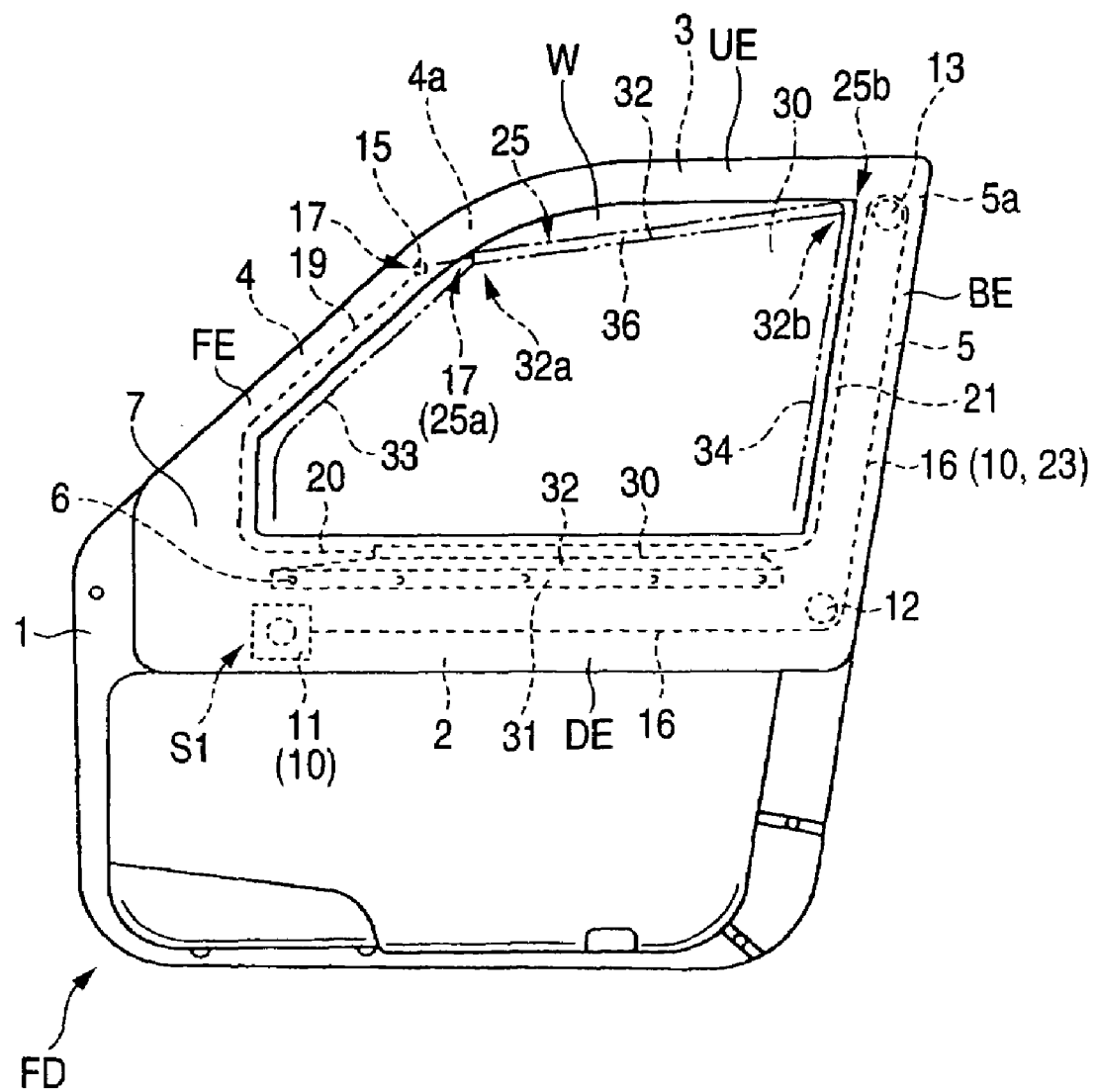
FIG. 2 is a front view of a door in which the occupant protection apparatus of the first embodiment is installed.
Figure 3:
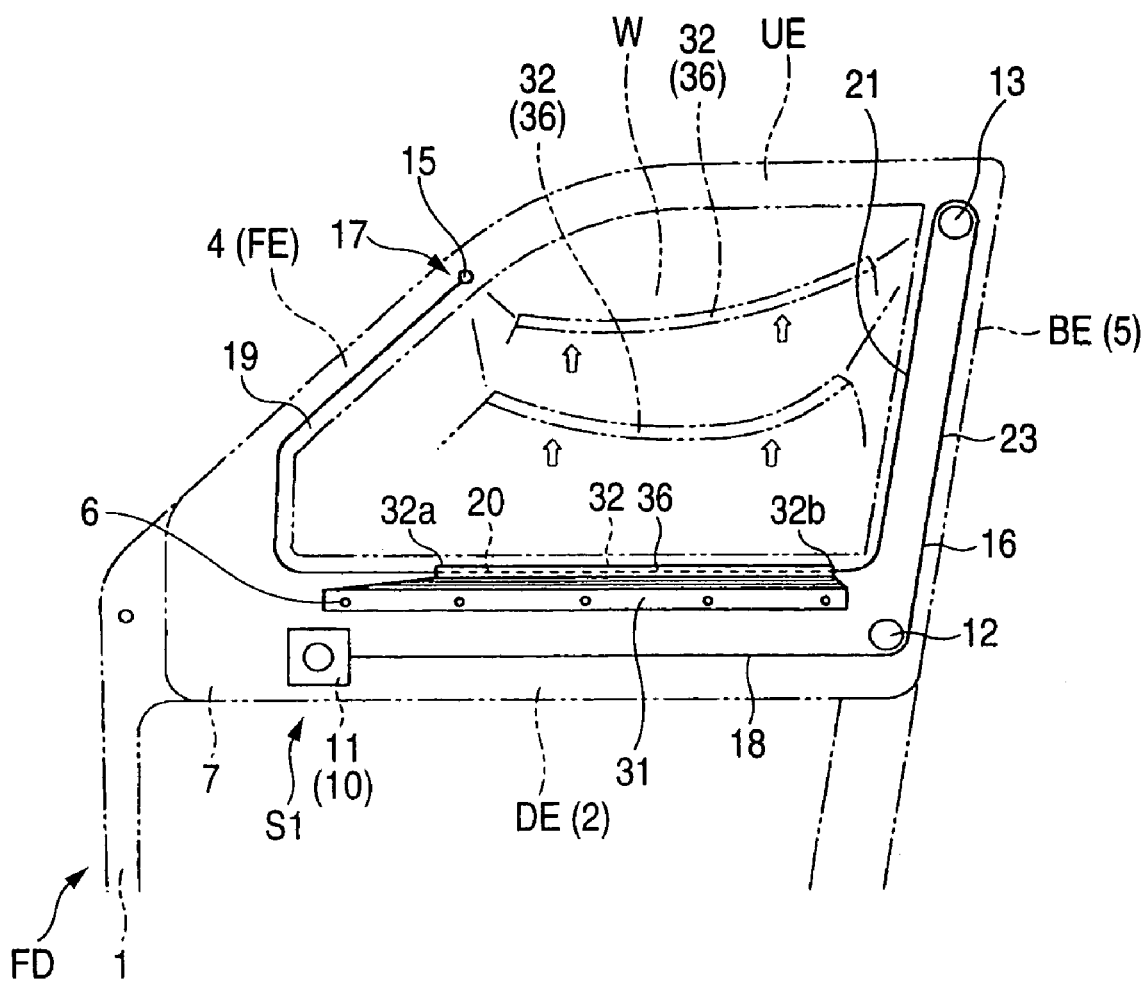
FIG. 3 is a schematic front view of the occupant protection apparatus of the first embodiment.

Hereinafter, embodiments of the invention will be described based on the accompanying drawings. As shown in FIGS. 1 to 3, an occupant protection apparatus S1 of a first embodiment includes a cover sheet 30 which is folded to be accommodated in a window (a side window) W of a vehicle V on a lower edge portion DE of a peripheral edge thereof and a pulling unit 10 which pulls up the cover sheet so as to cover the side window W. In the case of this embodiment, the side window W is provided in a front door FD of the vehicle V, and the cover sheet 30 and the pulling unit 10 are installed in the peripheral edge of the side window W.

In addition, this front door FD includes a door frame 1 which makes up the peripheral edge of the side window W, and a door trim 7 is mounted on an internal side of the door frame 1. The door frame 1 is provided with a front frame portion 4 which is situated on a front edge FF side of the peripheral edge of the side window W, a lower frame portion 2 which is situated on the lower edge portion DE of the peripheral edge of the side window W, an upper frame portion 3 which is situated on an upper edge portion UE of the peripheral edge of the side window W, and a rear frame portion 5 which is situated on a rear edge portion BE of the peripheral edge of the side window W.

The pulling unit 10 is provided with a pulling string 16 having flexibility and a pulling device 11 to which the pulling string 16 is connected so as to be pulled thereby and which is disposed below the side window W.

The operation of the pulling device 11 is controlled by a control unit 40, and when a signal that detects an overturn (rollover) of the vehicle V is inputted therein to from a sensor 41 which detects an overturn of the vehicle V, the control unit 40 activates the pulling device 11. In the case of this embodiment, the pulling device 11 is made to pull the pulling string 16 at the moment by using a small gas generator, an electromagnetic solenoid, the restoring force of a spring, an electric motor and the like. In addition, the pulling device 11 is fixed to the lower frame portion 2 lying on the lower edge portion DE of the peripheral edge of the side window W and is then covered by the door trim 7.

The pulling string 16 is provided with a cord material such as a wire which has flexibility and in which elongation is suppressed and is fixed to a position in the vicinity of an upper end on the front edge portion FE of the peripheral edge of the side window W at a distal end thereof which is far apart from the pulling device 11, the distal end being defined as a fixed end 17. In the case of this embodiment, the pulling string 16 is fixed to a position in the vicinity of an upper end 4a of the front frame portion 4 of the door frame 1 by using a fastener 15 such as a screw. In addition, when it is accommodated in the door frame 1 continuously from the distal fixed end 17 to a proximal portion 18 part thereof which lies toward the pulling device 11, the pulling string 16 is provided so as to descend from the distal end (the fixed end 17) along the front edge portion FE (the front frame portion 4) of the peripheral edge of the side window W, extend horizontally from a front end to a rear end of the lower edge portion DE (the lower frame portion 2) of the peripheral edge of the side window W, and ascend from a lower end of the rear edge portion BE (the rear frame portion 5) of the peripheral edge of the side window W, and furthermore, the pulling string 16 is accommodated so as to reverse its pulling direction in the vicinity of an upper end 5a of the rear frame portion 5 so as to continue to the pulling device 11.

In addition, a support member 13 is provided at the upper end 5a of the rear frame portion 5 of the door frame 1 which constitutes the rear edge portion BE of the peripheral edge of the side window W round which the pulling string 16 is wound so as to reverse its pulling direction and which slidably supports the pulling string 16. In the case of this embodiment, the support member 13 is provided with a rotatable free roller whose axial direction is oriented in a transverse direction of the vehicle.

A rotatable free roller 12 is provided in the lower frame portion 2 of the door frame 1 which constitutes the lower edge portion DE of the peripheral edge of the side window W in a position directly below the rear frame portion 5 where the proximal portion 18 part of the pulling string 16 is bent to be guided toward the pulling device 11. Incidentally, in case the pulling device 11 is provided directly below the rear frame portion 5 so as to pull the pulling string 16, the free roller 12 becomes unnecessary.

In addition, the pulling string 16 so accommodated, the free roller 12, and the support member 13 are covered together with the pulling device 11 and the cover sheet 30 which is folded to be accommodated by the door trim 7 which is situated on the internal side of the door frame 1, and when the occupant protection apparatus S1 is activated, the edges of the side window W which correspond to the front frame portion 4, the lower frame portion 2 and the rear frame portion 5 of the door frame 1 are pushed to open by the pulling string 16 and the cover sheet 30.

Namely, to describe the pulling string 16, when the pulling string 16 is accommodated, a front edge accommodated portion 19 which descends from the distal fixed end 17 along the front edge portion FE of the peripheral edge of the side window W is accommodated between the front frame portion 4 and the door trim 7, a lower edge accommodated portion 20 which extends from the front end to the rear end of the lower edge portion DE of the peripheral edge of the side window W is accommodated between the lower frame portion 2 and the door trim 7, and a rear edge accommodated portion 21 which ascends from the lower end on the rear edge portion BE of the peripheral edge of the side window W is accommodated between the rear frame portion 5 and the door trim 7. Then, when the pulling device 11 is activated to pull the pulling string 16 from its accommodated state, the pulling string 16 changes its configuration such that portions of the pulling string 16 which correspond to the rear edge accommodated portion 21 and the lower edge accommodated portion 20 are pulled toward a reversed portion 23 of the pulling string 16 which is reversed in the pulling direction from the support member 13 while the lower edge accommodated portion 20 disposed on the lower edge portion DE of the peripheral edge of the side window W is caused to rise, as shown in FIG. 3. As this occurs, the front edge accommodated portion 19, the lower edge accommodated portion 20 and the rear edge accommodated portion 21 of the pulling string 16 push to open portions of the door trim 7 which cover the front frame portion 4, the lower frame portion 2 and the rear frame portion 5 of the door frame 1 on the external side thereof and then move across the area of the side window W. Thereafter, as shown in FIG. 4, the pulling string 16 continues to be pulled to become a straight line along a resulting portion which extends straight from the fixed end 17 to where it is supported by the support member 13, the portion being defined as a fixed end terminal portion 25, where the deployment of the cover sheet 30 completes.

In addition, in the straight-line portion (the fixed end terminal portion) 25 of the pulling string 16 which results when the cover sheet 30 completes its deployment, the fixed end 17 is disposed further downward than where the support member 13 is disposed, whereby the height of a rear end portion 25b which lies toward the support member 13 from the lower edge portion DE of the peripheral edge of the side window W is set higher than that of a front end portion 25a.

Figure 4:
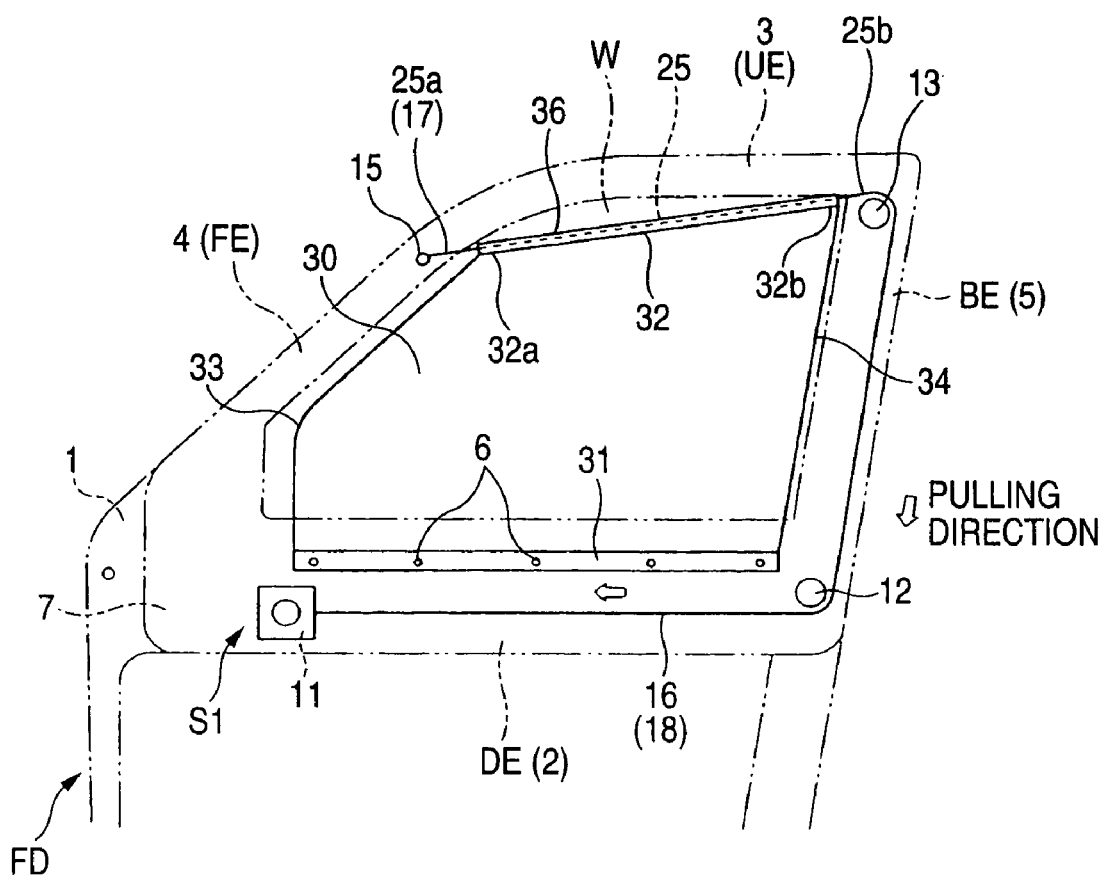
FIG. 4 is a schematic front view of the occupant protection apparatus of the first embodiment when the operation of the system is completed.
Figure 6:
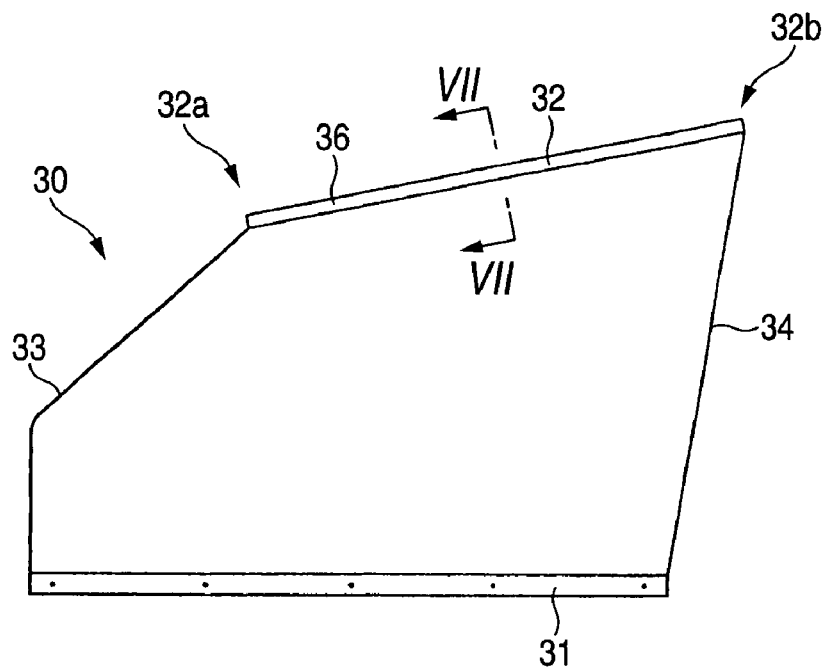
FIG. 6 is a diagram showing a state in which the cover sheet is deployed which is used in the occupant protection apparatus of the first embodiment.
Figure 7:
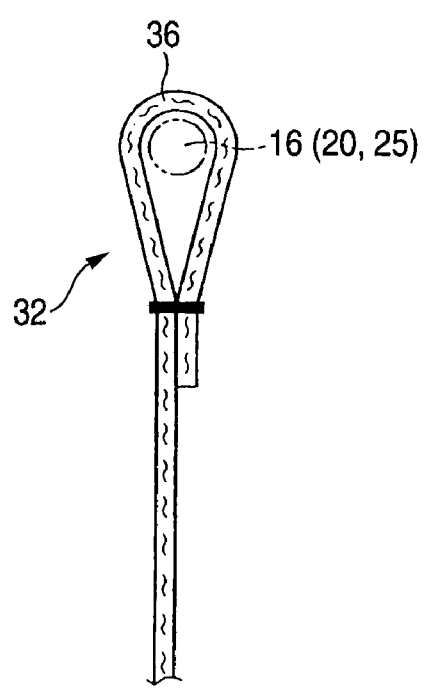
FIG. 7 is a partial sectional view taken along a portion as indicated by the line VII-VII in FIG. 6.

As shown in FIGS. 4, 6 and 7, the cover sheet 30 is provided with a flexible sheet which is formed of a fabric material of polyester fibers or polyamide fibers and is formed into a shape which can cover almost a whole area of the side window W from a lower edge to an upper edge thereof when the cover sheet 30 deploys flat. Namely, as shown in FIG. 4, when deployed flat in such a state that it is installed in the vehicle, the cover sheet 30 is formed such that an upper side 32 part thereof extends substantially along the upper edge portion UE of the peripheral edge of the side window W, a frond edge 33 part thereof extends substantially along the front edge portion FE of the peripheral edge of the side window W, and a rear edge 34 part thereof extends substantially along the rear edge portion BE of the peripheral edge of the side window W. In addition, the cover sheet 30 is fixed to the lower frame portion 2 of the door frame 1 which constitutes the lower edge portion DE of the peripheral edge of the side window W along almost a whole area of a lower side 31 part of the cover sheet 30 which has deployed flat by using bolts 6.

In addition, the cover sheet 30 is folded such that the upper side 32 part, which is made to constitute a side part to be pulled by the pulling unit 10, approaches the lower side 31 part, so as to be accommodated only in the lower edge portion DE of the peripheral edge of the side window W. Note that, in the case of this embodiment, the cover sheet 30 is folded in a bellows fashion with folds oriented in a longitudinal direction.

Additionally, as shown in FIGS. 6 and 7, a passageway portion 36 trough which the pulling string 16 is slidably passed is formed on the upper side 32 part of the cover sheet 30 by forming a whole area of the upper side 32 part from a front end 32*a* to a rear end 32*b* into a tubular portion. The lower edge accommodated portion 20 which constitutes the portion of the pulling string 16 which is disposed on the lower edge portion DE of the peripheral edge of the side window W is inserted to be staying in the passageway portion 36 in such a state that the pulling string 16 is accommodated in the door frame when it is installed on the vehicle (refer to FIG. 3).

In addition, in the cover sheet 30 of this embodiment, the upper side part 32 including the passageway portion 36 is formed so as to correspond to the height-wise position of the fixed end 17 of the pulling string 16 and the support member 13, that is, such that the height of the rear end 32*b* of the upper side 32 is set higher than that of the front end 32*a* thereof so that the rear end 32*b* is held farther apart from the lower side 31 part than the front end 32*a*.

When installing the occupant protection apparatus of the first embodiment on the vehicle V, the cover sheet 30 is folded in such a state that the pulling string 16 is passed through the passageway portion 36, the cover sheet 30 is then wrapped round by a breakable wrapping material, not shown, which is designed to prevent the collapse of the folded cover sheet 30, and the lower side 31 part of the cover sheet 30 is fixed to the lower frame portion 2 of the door frame 1 by using the bolts 6. In addition, the pulling device 11, to which the pulling string 16 is connected, is fixed to the lower frame portion 2 of the door frame 1, and the pulling string 16 is wound round the free roller 12 and the support member 13 and is fixed to the upper end 4*a* of the front frame portion 4 at the distal end (fixed end) 17 thereof. Then, the front edge accommodated portion 19, the lower edge accommodated portion 20, the rear edge accommodated portion 21 and the reversed portion 23 of the pulling string 16 are disposed in predetermined positions on the front frame portion 4, the lower frame portion 20 and the rear frame portion 5, respectively, while eliminating as much looseness as possible, and then the door trim 7 is mounted on the door frame 1. Thereafter, an activation signal inputting lead wire which extends from the control unit 40 is connected to the pulling device 11, and then the front door FD is mounted on the vehicle V, whereby the occupant protection apparatus S1 can be installed on the vehicle V.

After the occupant protection apparatus S1 of the first embodiment is installed on the vehicle V, when a signal is inputted into the control unit 40 from the sensor 41 for detecting an overturn of the vehicle V, the control unit 40 activates the pulling device 11. Then, when the pulling device 11 is activated to pull the pulling string 16, the pulling string 16 is pulled while the lower edge accommodated portion 20 disposed on the lower edge portion DE of the peripheral edge of the window W is caused to rise.

As this occurs, the cover sheet 30 has the passageway portion 36 through which the pulling string 16 is passed through along the upper side part 32 thereof, and hence, the pulling string 16 pulls up the passageway portion 36 while passing therethrough. Due to this, the upper side 32 part of the cover sheet 30 is pulled up, and the fixed end terminal portion 25 of the pulling string 16, which extends from the fixed end 17 to where it is supported by the support member 13, is made to become a straight line, during which the cover sheet 30 completes its deployment which has been started from the folded and accommodated state, as shown in FIGS. 3 and 4, whereby almost the whole area of the side window W from the lower edge to the upper edge thereof is covered by the area of the cover sheet 30 which extends from the lower side 31 part which is fixed to the lower edge portion DE of the peripheral edge of the window W to the upper side 32 part thereof.

Namely, even in the event that the cover sheet 30 is accommodated in the side window W only along the lower edge portion DE of the peripheral edge thereof, the cover sheet 30 is pulled up smoothly by the pulling string 16 which passes through the passageway portion 36 when pulled so as to cover almost the, whole area of the side window W from the lower edge portion DE to the upper edge portion UE of the peripheral edge of the side window W.

Figure 5A:
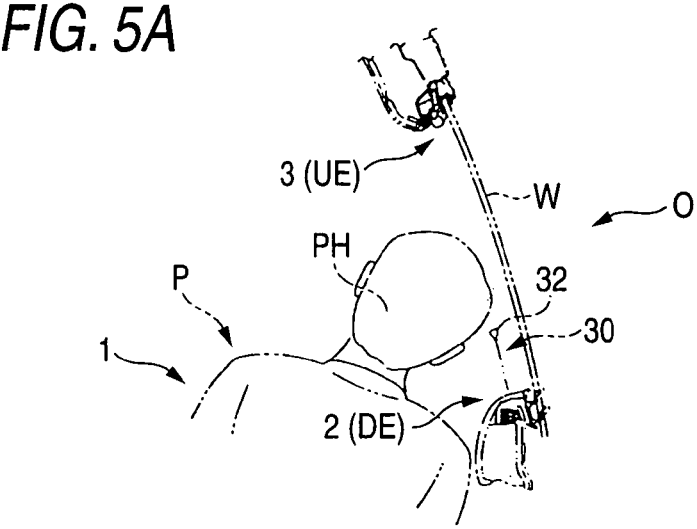
FIGS. 5A through 5C are schematic vertical sectional views showing sequentially how a cover sheet rises when the occupant protection apparatus of the first embodiment is activated.
Figure 5B:
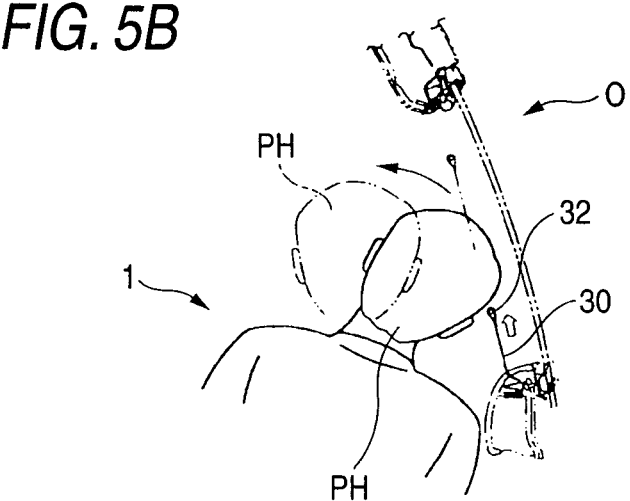
Figure 5C:
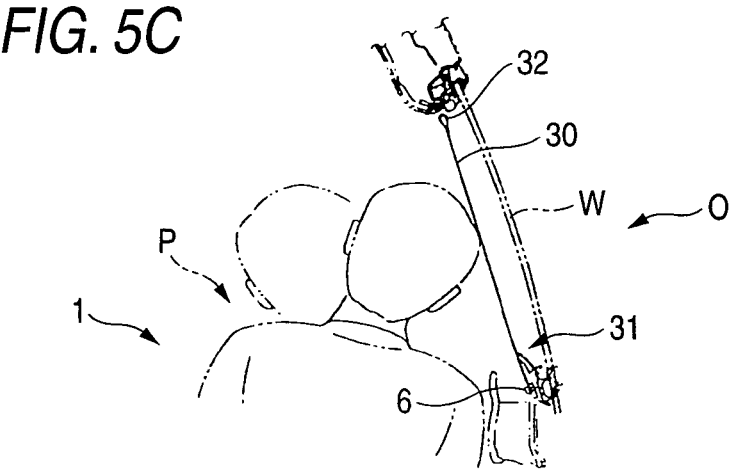

In addition, in the occupant protection apparatus S1 of the first embodiment, as shown in FIGS. 5A, 5B and 5C, when the cover sheet 30 deploys, even in the event that a head portion PH of an occupant P is so close to the lower edge portion of the peripheral edge of the side window W as to rest thereon, the cover sheet 30 causes the relevant portion (the head portion) PH of the occupant P to erect to return toward an inside I of the vehicle, so that the cover sheet 30 covers the side window W. Thereafter, even in the event that the occupant P is caused to move toward an outside O of the vehicle, the cover sheet 30 holds the occupant P within the inside I of the vehicle, so as to protect the occupant.

Consequently, in the occupant protection apparatus of the first embodiment, even in the event that the cover sheet 30 is configured to cover almost the whole area of the side window W from the lower edge portion DE to the upper edge portion UE of the peripheral edge thereof, the cover sheet 30 can be accommodated in the side window W only along the lower edge portion DE of the peripheral edge thereof. In addition, the front edge 33 and the rear edge 34 of the peripheral edge of the side window only have to have the spaces where the pulling string 16 and the support member 13 are accommodated, and the folded cover sheet 30, the pulling device 11 and the free roller 12 can be disposed below the side window W where ample space is available. Thus, the occupant protection apparatus S1 of the first embodiment can easily be installed even in the front door FD where space is limited.

In addition, in the first embodiment, in the cover sheet 30, the whole area of the upper side 32 part from the front end 32a to the rear end 32b is formed into the tubular shape to form the passageway 36. Due to this, compared to the case where the passageway portion 36 is provided partially on the upper side 32 part in an intermittent fashion, the whole area of the part which lies in the vicinity of the upper edge of the side window W can be covered by the upper side 32 part of the cover sheet 30 with no gap. Namely, in the case where the passageway portion 36 is provided partially on the upper side 32 part of the cover sheet 30 in the intermittent fashion, when the deployment of the cover sheet 30 is completed, there is produced a portion on the upper side 32 part of the cover sheet 30 which is partially pulled toward the lower side 31 part thereof between the passageway portions 36, and the portion is pulled downward so as to be held apart from the fixed end terminal portion 25 of the pulling string 16, resulting in a risk where a space is produced in the cover sheet 30 which uncovers the side window W. In contrast to this, as in the first embodiment, in the vent that the whole area of the upper side 32 part of the cover sheet 30 is made to form the passageway portion 36, there is caused no risk where the portion is produced which is held apart from the fixed end terminal portion 25 of the pulling string 16.

Figure 8A:
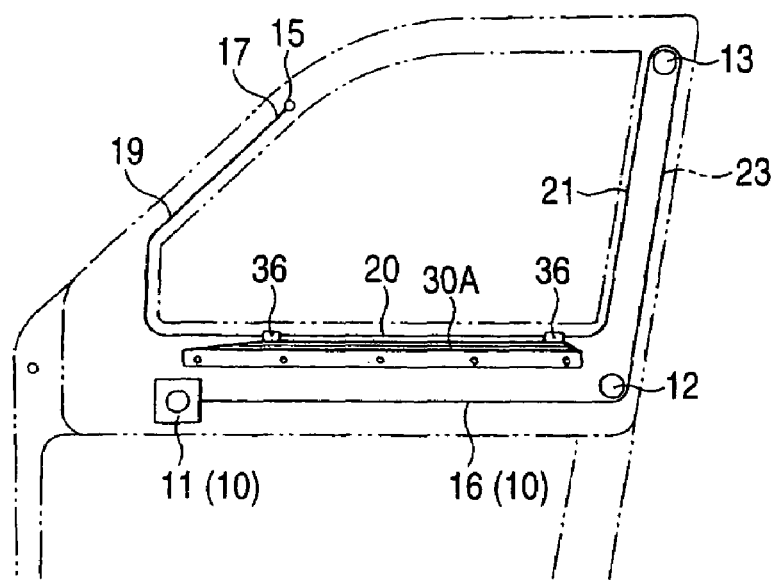
FIGS. 8A and 8B are diagrams showing sequentially how a modified example to the first embodiment is activated.
Figure 8B:
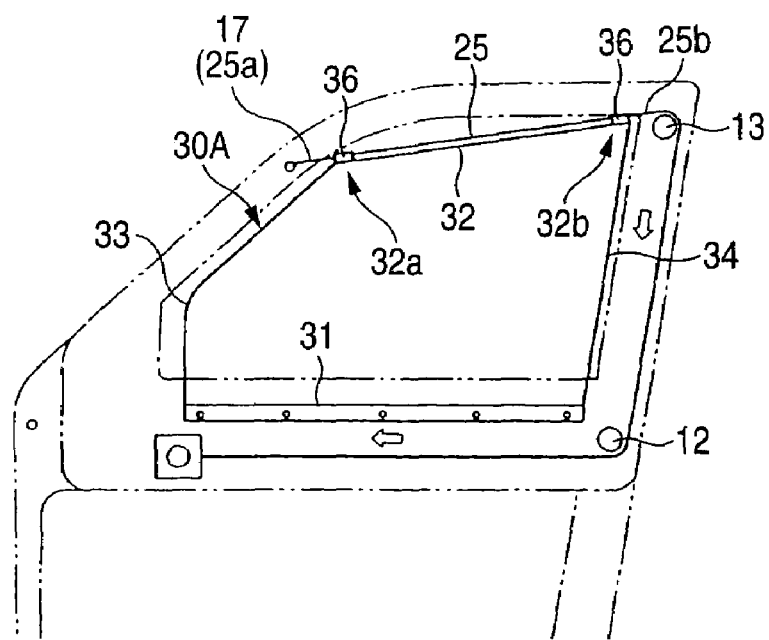

Of course, in case the aforesaid point is not taken into consideration, the passageway portion 36 through which the pulling string 16 is slidably passed may be provided only at the front end 32a and the rear end 32b of the upper side 32 part as with a cover sheet 30A illustrated in FIGS. 8A and 8B.

Figure 9:
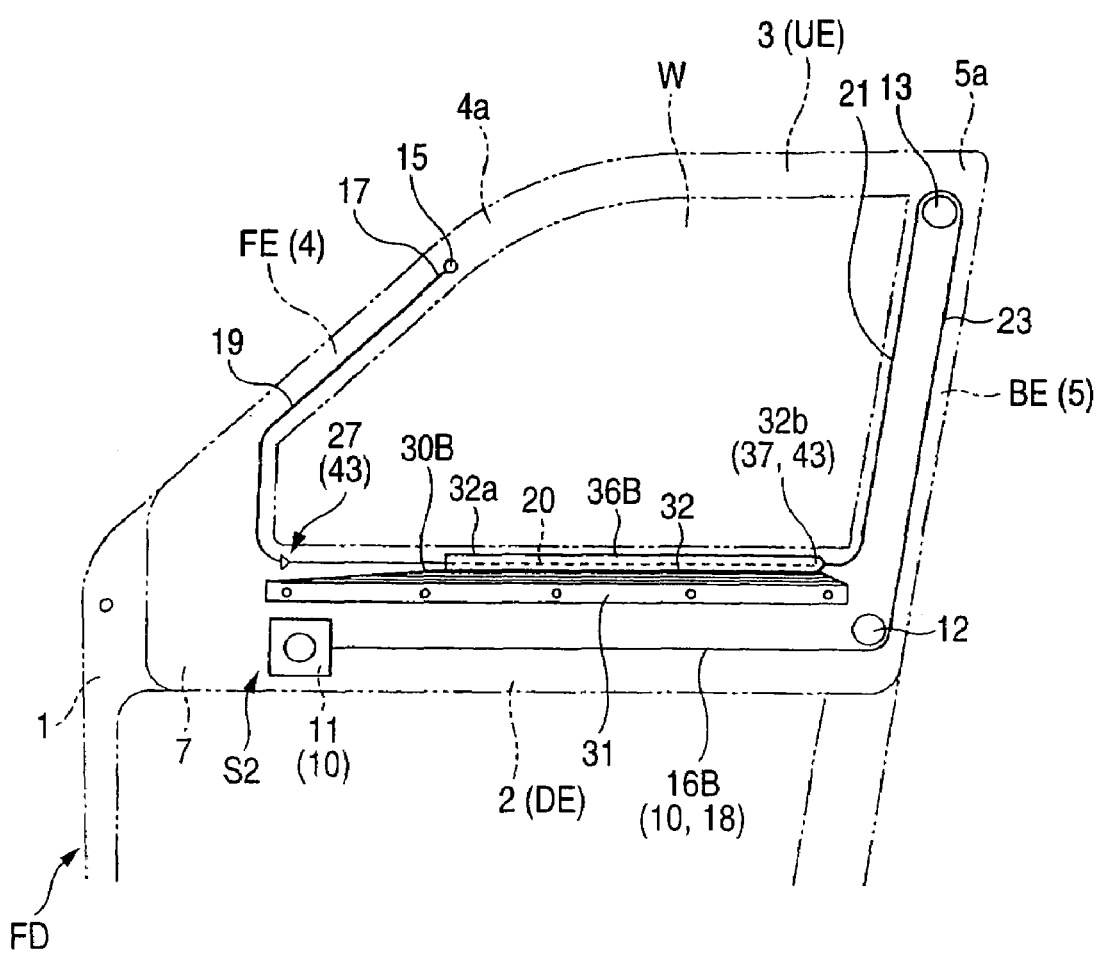
FIG. 9 is a schematic front view of an occupant protection apparatus of a second embodiment.
Figure 10:
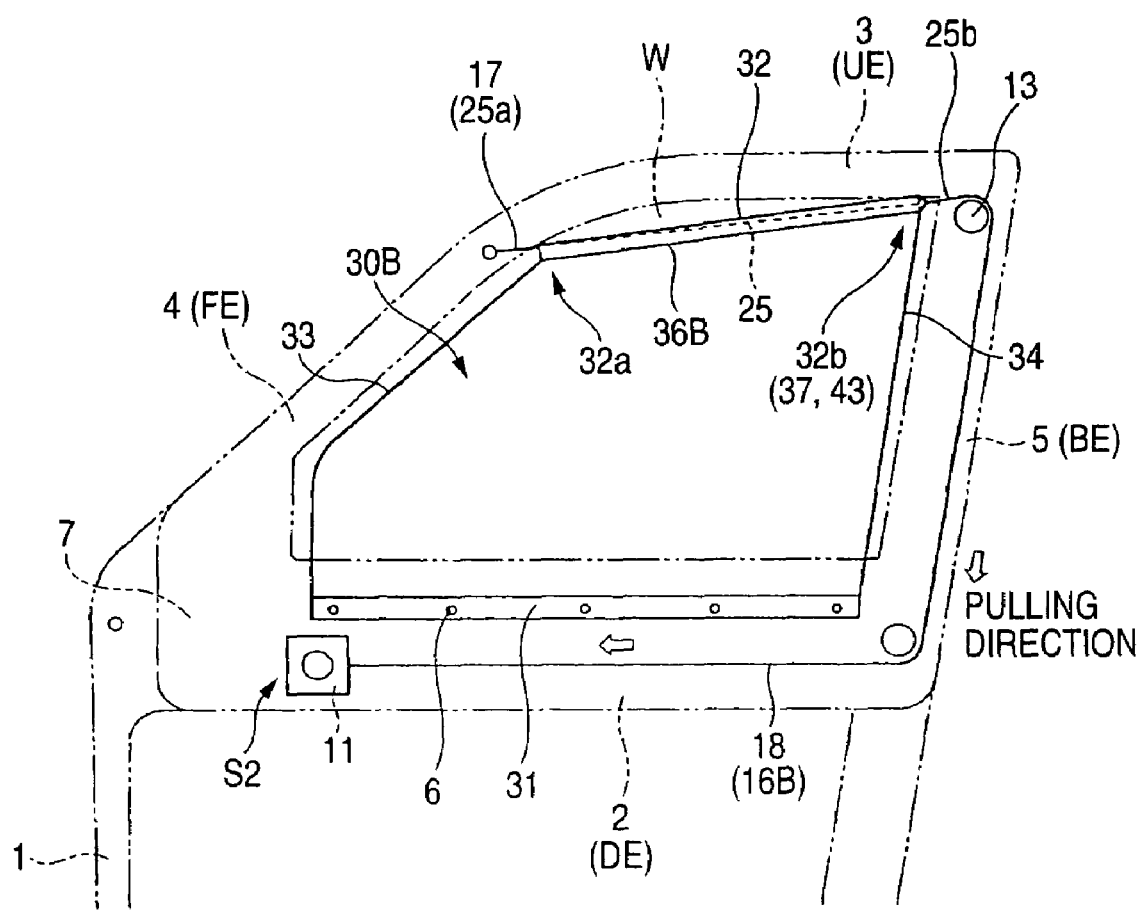
FIG. 10 is a schematic front view of the occupant protection apparatus of the second embodiment when the operation of the system is completed.

In addition, the occupant protection apparatus of the invention may be configured into an occupant protection apparatus S2 of a second embodiment which is shown in FIGS. 9 and 10. In this second embodiment, in order that a portion (a pulling source-end end portion) 37 of a passageway portion 36B of an upper side 32 part of a cover sheet 30B which lies toward a support member 13 can be prevented from returning toward a fixed end 17 of a pulling string 16b, a stopper mechanism 43 is provided the pulling source-end end portion 37 of the passageway portion 36b and the pulling string 16B such that constituent elements provided thereon are brought into engagement with each other.

Figure 11A:
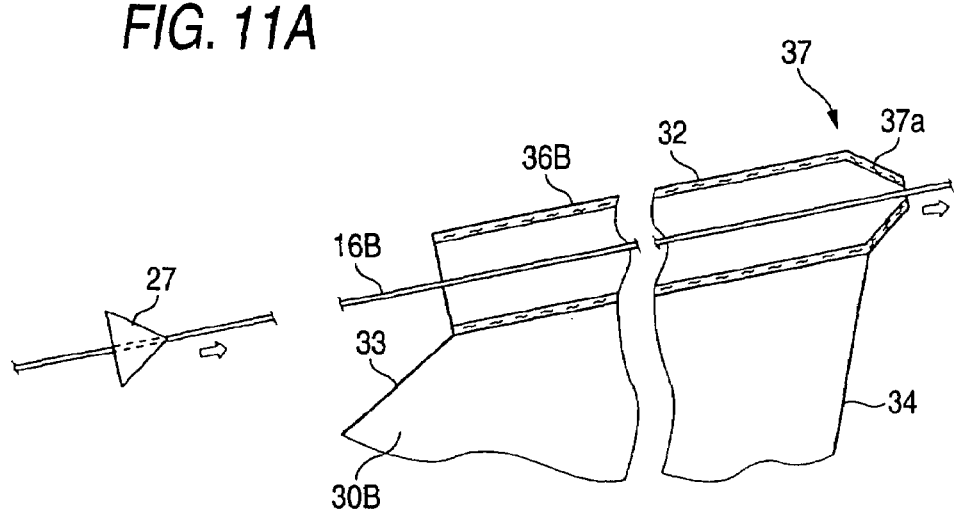
FIGS. 11A and 11B are diagrams showing sequentially how a stopper mechanism operates in the occupant protection apparatus of the second embodiment.
Figure 11B:
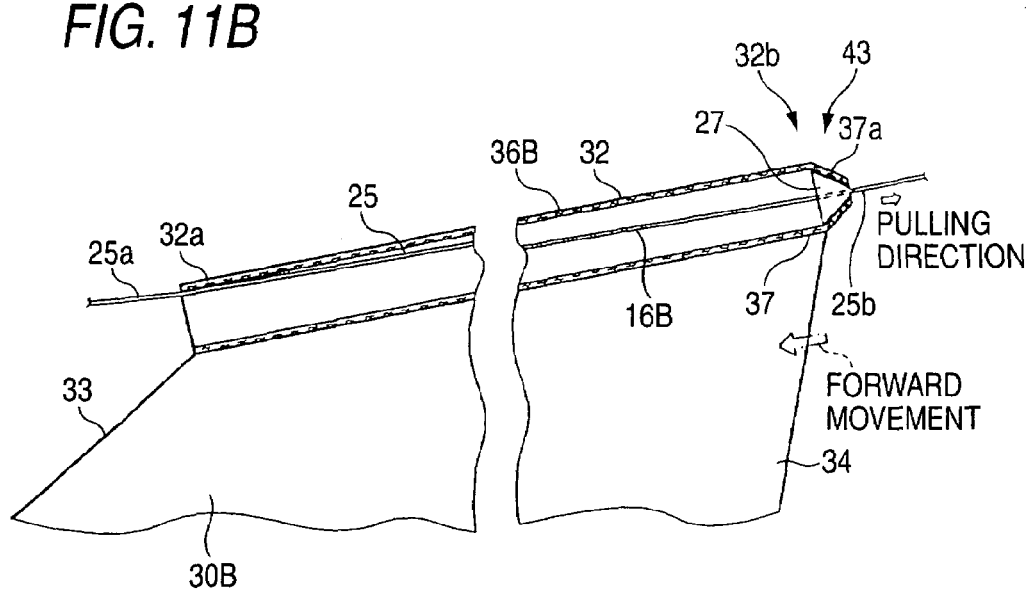
Figure 12:
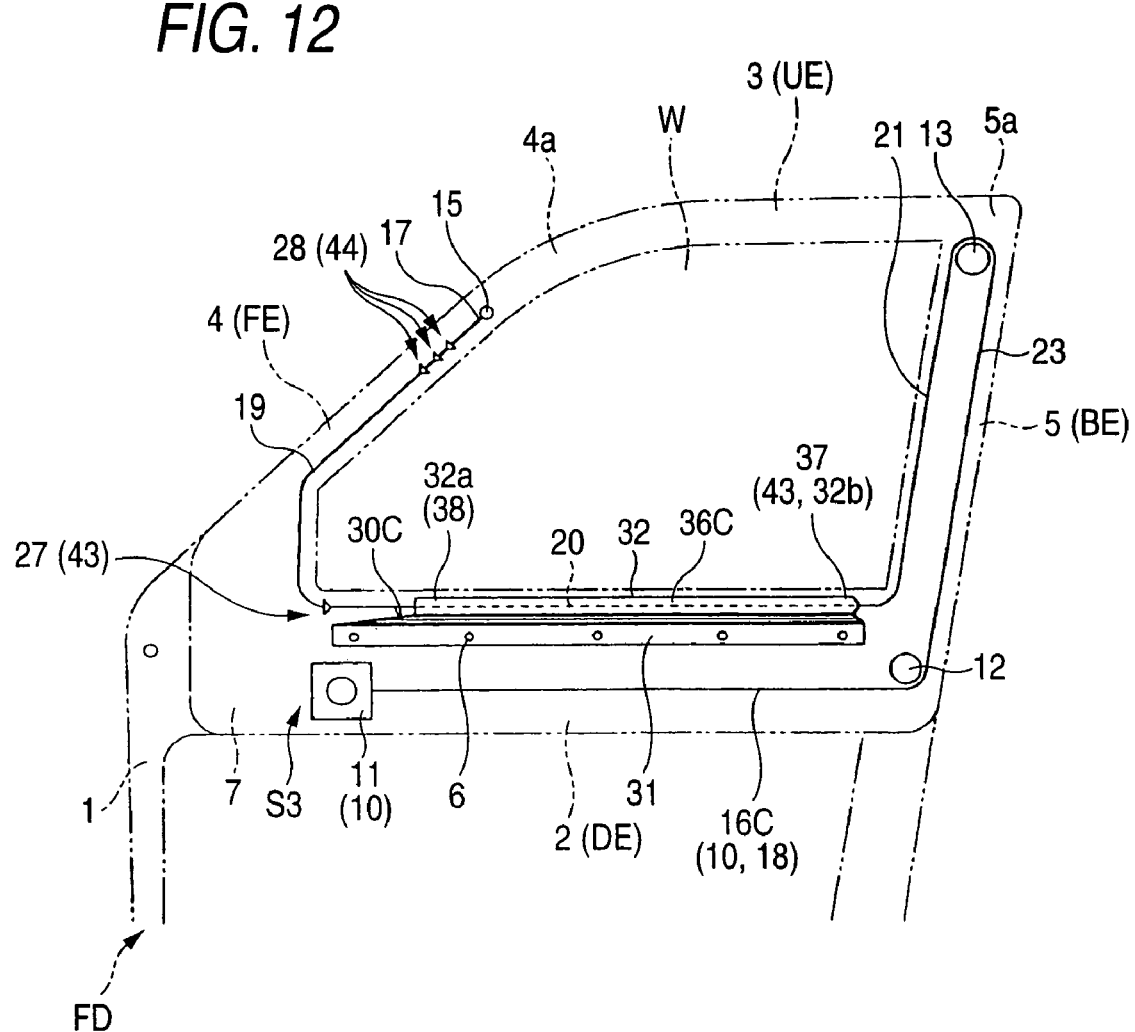
FIG. 12 is a schematic front view of an occupant protection apparatus of a third embodiment.
Figure 13:
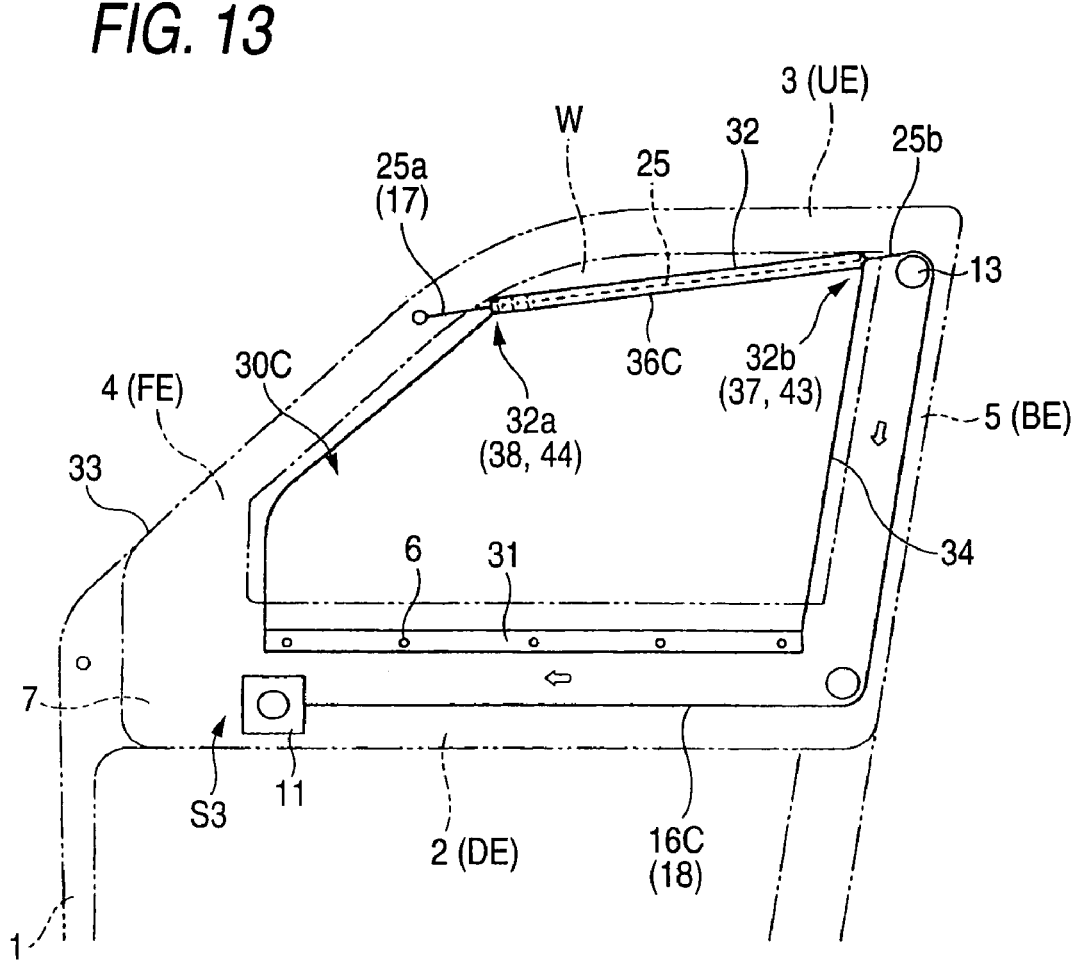
FIG. 13 is a schematic front view of the occupant protection apparatus of the third embodiment when the operation of the system is completed.

As shown in FIGS. 9, 11A, and 11B, the stopper mechanism 43 is provided with a pulling block 27 and a constricted portion 37a at the pulling source-end end portion 37. The pulling block 27 is formed of a metallic material or synthetic resin material which has rigidity and is formed into a conical shape which is diametrically expanded on a side which faces the fixed end 17 with an apex disposed on a side which faces the support member 13. The constricted portion 37a is formed into a tapered tubular shape which gradually reduces its diameter as it extends toward the support member 13 and which has an inside diameter which enables the passage of the pulling string 16B itself but disables the passage of the pulling block 27. In addition, the passageway portion 36B is disposed over the whole area of the upper side 32 of the cover sheet 30 and has an inside diameter which enables the passage of the pulling block 27 except the constricted portion 37a. Additionally, a position on the pulling string 16B where the pulling block 27 is disposed is set such that when the pulling string 16B is pulled, whereby the cover sheet 30 completes its deployment, the pulling block 27 comes to be disposed at the constricted portion 37a so that the pulling source-end end portion 37 can be pulled toward the support member 13.

Note that the second embodiment differs from the first embodiment only in that the pulling block 27 is secured to the pulling string 16B, that with respect to the inside diameter of the passageway portion 36B, the cover sheet 30B enables the passage of the pulling block 27 except at the constricted portion 37a and that the constricted portion 37a enables the passage of the pulling string 16B but disables the passage of the pulling block 27, and hence, the other constituent portions and constituent components of the second embodiment are similar to those of the first embodiment, and like reference numerals are imparted to like portions and components to those of the first embodiment. In addition, as with the first embodiment, the second embodiment is also installed on the vehicle.

In the occupant protection apparatus S2 of the second embodiment, when it is activated, the same function and advantage as those of the first embodiment can be obtained. In addition to this, when the cover sheet 30B completes its deployment, the pulling block 27, which makes up the stopper mechanism 43, is fitted in the constricted portion 37a at the pulling source-end end portion 37 of the passageway portion 36B, and the pulling source-end end portion 37 of the upper side 32 part of the cover sheet 30B is pulled toward the support member 13, whereby a rear edge 34 of the completely deployed cover sheet 30B which constitutes an edge lying toward the support member 13 is prevented from moving toward a front side or toward the center of a side window W, whereby the reduction in area of the cover sheet 30B which covers the side window W can be suppressed when and after the cover sheet 30B has deployed completely to hold the occupant.

In addition, in the occupant protection apparatus S2 of the second embodiment, as with the first embodiment, the height of the fixed end 17 and the support member 13 is set such that when the cover sheet 30B completes its deployment, a fixed end terminal portion 25 which extends from the fixed end 17 of the pulling string 16 toward the support member 13 is held farther apart from a lower edge portion DE of a peripheral edge of the side window W at a portion thereof which lies toward the support member 13 than at the fixed end 17, and the cover sheet 30B is also set such that the upper side 32 part is held apart from the lower side 31 part so as to correspond to the height-wise position of the fixed end 17 and the support member 13, that is, set such that the rear end 32b of the upper side 32 is held farther apart from the lower side 31 part than the front end 32a thereof.

Due to this, in the upper side 32 part of the cover sheet 30B which has completed its deployment, the height of an end portion (front end) 32a part which is farther apart from the support member 13 is made lower than that of an end portion (rear end) 32b part which lies toward the support member 13, and therefore, the cover sheet 30B is made difficult to rise. Namely, the end portion (front end) 32a part of the upper side 32 part of the cover sheet 30B which lies farther apart from the support member 13 is made difficult to approach the support member 13, and in conjunction with the configuration in which the end portion (rear end) 32b of the upper side 32 part of the cover sheet 30B which lies toward the support member 13 is controlled with respect to its position so as not to move apart from the support member 13 side by the stopper mechanism 43, a front edge 33 and a rear edge 34 of the cover sheet 30B are prevented from moving toward the center of the side window W, whereby the reduction in area of the cover sheet 30B which covers the side window W can be further suppressed when and after the cover sheet 30B has deployed completely to hold the occupant.

In addition, when providing a stopper mechanism between the cover sheet and the pulling string, the occupant protection apparatus of the invention may be configured into an occupant protection apparatus S3 of a third embodiment in which two stopper mechanisms 43, 44 are provided as shown in FIGS. 12 to 15C. Namely, in addition to a first stopper mechanism 43 which is provided between a portion of a passageway portion 36C which lies toward a support member 13 and a pulling string 16C, a second stopper mechanism 44 is provided.

Figure 14:
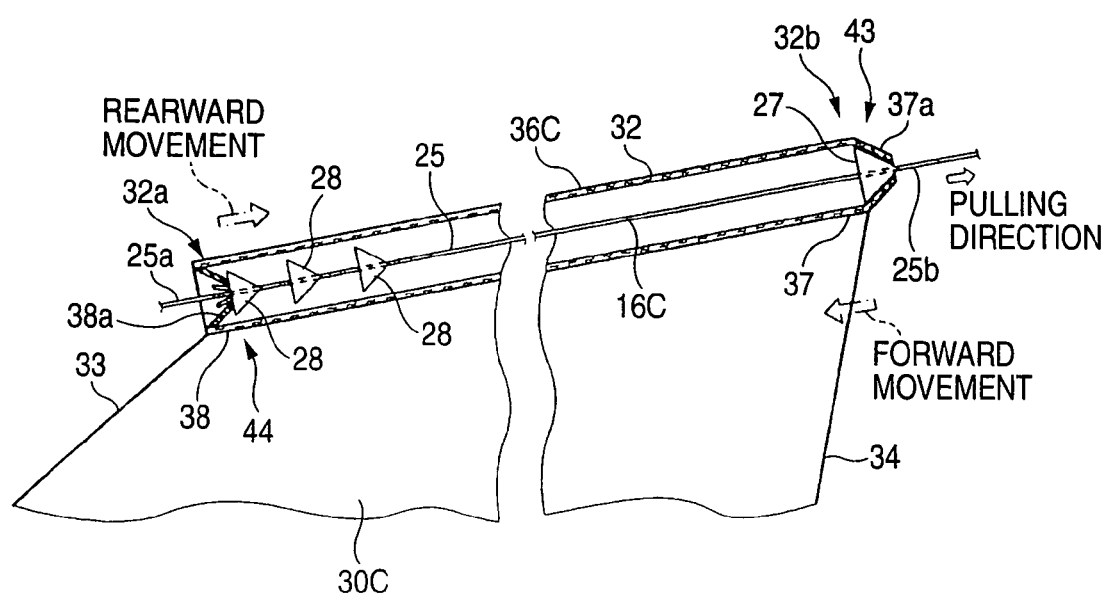
FIG. 14 is a sectional view showing a state in which first and second stopper mechanisms complete their operations in the occupant protection apparatus of the third embodiment.
Figure 15A:
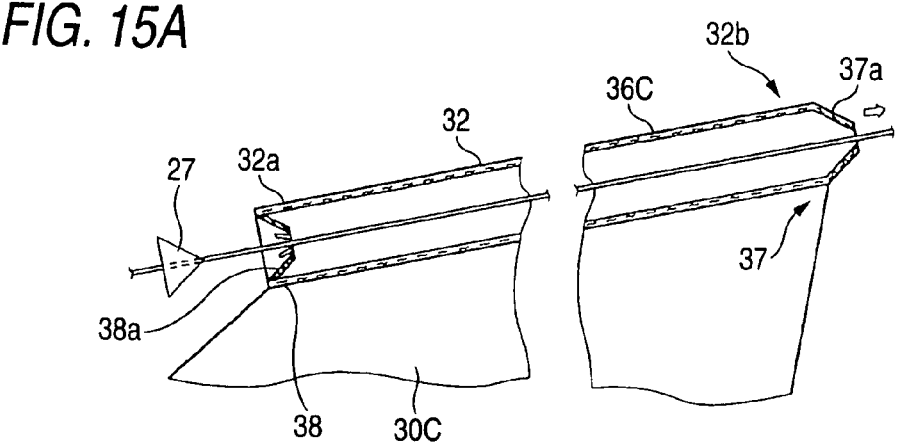
FIGS. 15A though 15C are diagrams showing sequentially how the first and second stopper mechanisms operate in the occupant protection apparatus of the third embodiment.
Figure 15B:
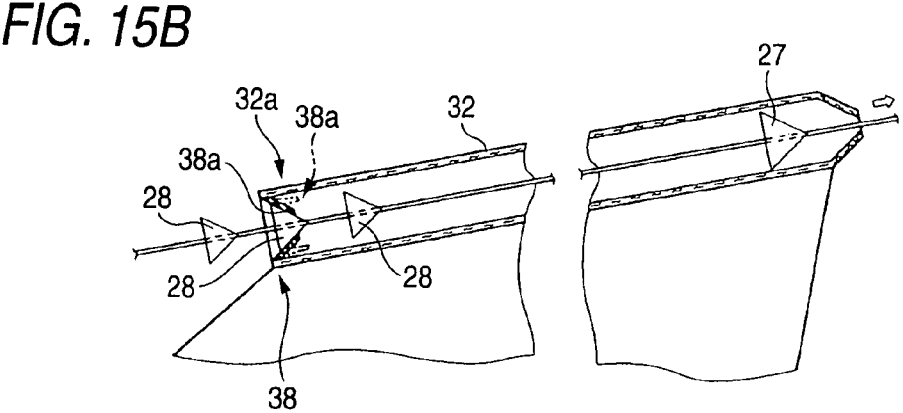
Figure 15C:
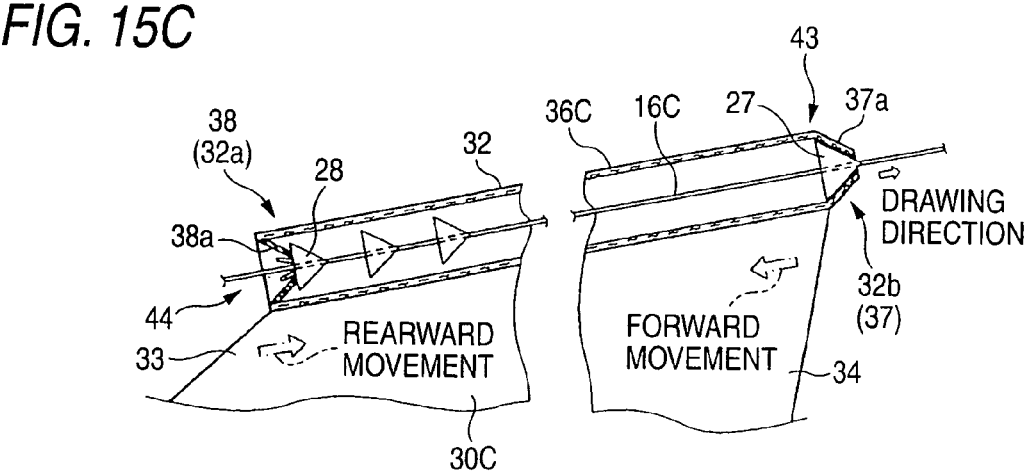

As shown in FIGS. 14 to 15C, similar to the second embodiment, the first stopper mechanism 43 is provided with a pulling block 27 secured to the pulling string 16C and a constricted portion 37a at a pulling source-end end portion 37. Namely, The pulling block 27 is formed of a metallic material or synthetic resin material which has rigidity and is formed into a conical shape which is diametrically expanded on a side which faces a fixed end 17 with an apex disposed on a side which faces the support member 13. The constricted portion 37a is formed into a tapered tubular shape which gradually reduces its diameter as it extends toward the support member 13 and which has an inside diameter which enables the passage of the pulling string 16C itself but disables the passage of the pulling block 27.

In addition, the second stopper mechanism 44 is provided with a control block 28 provided on the pulling string 16C and a non-return claw portion 38a provided on a fixed-end end portion 38 of the passageway portion 36C on an upper side 32 of the cover sheet 30C which claw portion lies toward the fixed end 17. The control block 28 is formed of a metallic material or synthetic resin material which has rigidity and is formed into a conical shape which is diametrically expanded on a side which faces the fixed end 17 with an apex disposed on a side which faces the support member 13, and the control block 28 is made smaller in size than the pulling block 27. In the case of this embodiment, three control blocks 28 are secured to the pulling string 16C. The non-return claw portion 38a is formed into a tapered tubular shape which gradually reduces its diameter as it extends toward the support member 13 and enables, as shown in FIG. 15A, 15B, 15C, the passage of not only the pulling string 16C but also the pulling block 27 and the control blocks 28. The non-return claw portion 38a, however, controls the return of the control blocks 28 so that the control blocks 28 which have once passed therethrough are not allowed to return toward the fixed end 17 even when they attempt to. Namely, the non-return claw portion 38a is set such that the non-return claw portion 38a cannot ride over the control block 28 which has passed therethrough and stopped just after the passage and does not move toward the support member 13.

In addition, the passageway portion 36C, which has the fixed-end end portion 38 and the pulling source-end end portion 37 provided at the front and rear ends thereof, respectively, is disposed to extend over the whole area of the upper side 32 of the cover sheet 30C in the form of a tube and is set such that the pulling block 27 can pass therethrough except at a constricted portion 37a.

Additionally, a position on the pulling string 16 where the pulling block 27 is disposed is set such that when the pulling string 16C is pulled, whereby the cover sheet 30C has completed its deployment, the pulling block 27 comes to be disposed in the constricted portion 37a so that the pulling source-end end portion 37 can be pulled toward the support member 13. In addition, portions on the pulling string 16C where the control blocks 28 are disposed are set such that when the pulling string 16C is pulled, whereby the cover sheet 30C has completed its deployment, all the control blocks 28 manage to pass through the non-return claw portion 38a and the control block 28 which lies toward the fixed end 17 comes to be positioned in the vicinity of the non-return claw portion 38a.

Note that the third embodiment differs from the first and second embodiments only in that not only the pulling block 27 but also the control blocks 28 are secured to the pulling string 16C and that not only the pulling source-end end portion 37 which has the constricted portion 37a but also the fixed-end end portion 38 which has the non-return claw portion 38a are provided on the passageway portion 36C on the cover sheet 30C, and the other constituent portions and constituent components of the third embodiment are similar to those of the first and second embodiments, and hence like reference numerals are imparted to like portions and components to those of the first and second embodiments. In addition, the third embodiment is also installed on the vehicle as with the first embodiment.

In the occupant protection apparatus S3 of the third embodiment, when it is activated, the same function and advantage as those of the first embodiment can be obtained. In addition to this, when the cover sheet 30C completes its deployment, the pulling block 27, which makes up the first stopper mechanism 43, is fitted in the constricted portion 37a at the pulling source-end end portion 37 of the passageway portion 36C, and the pulling source-end end portion 37 of the upper side 32 part of the cover sheet 30C is pulled toward the support member 13, whereby a rear edge 34 of the completely deployed cover sheet 30C which constitutes an edge lying toward the support member 13 is prevented from moving toward a front side or toward the center of a side window W. In addition, as this occurs, the control blocks 28, which form the second stopper mechanism 44, pass through the non-return claw portion 38a at the fixed-end end portion 38, and the movement of the non-return claw portion 38a of the fixed-end end portion 38 toward the support member 13 is controlled by the control block 28 lying toward the fixed end 17 which has stopped moving.

Namely, the end portion (front end) 32a part of the upper side 32 part of the cover sheet 30C which lies farther apart from the support member 13 is made difficult to approach the support member 13 by the second stopper mechanism 44 and is controlled with respect to rearward movement, and the end portion (rear end) 32b of the upper side 32 part of the cover sheet 30C which lies toward the support member 13 is controlled with respect to its position so as not to move apart from the support member 13 side, whereby in conjunction with the configuration in which the forward movement is controlled so as not to occur, both the front edge 33 and the rear edge 34 of the cover sheet 30C are controlled so as not to move toward the center of the side window W, so that the reduction in area of the cover sheet 30C which covers the side window W can be further suppressed when and after the cover sheet 30C has deployed completely to hold the occupant.

Figure 16:
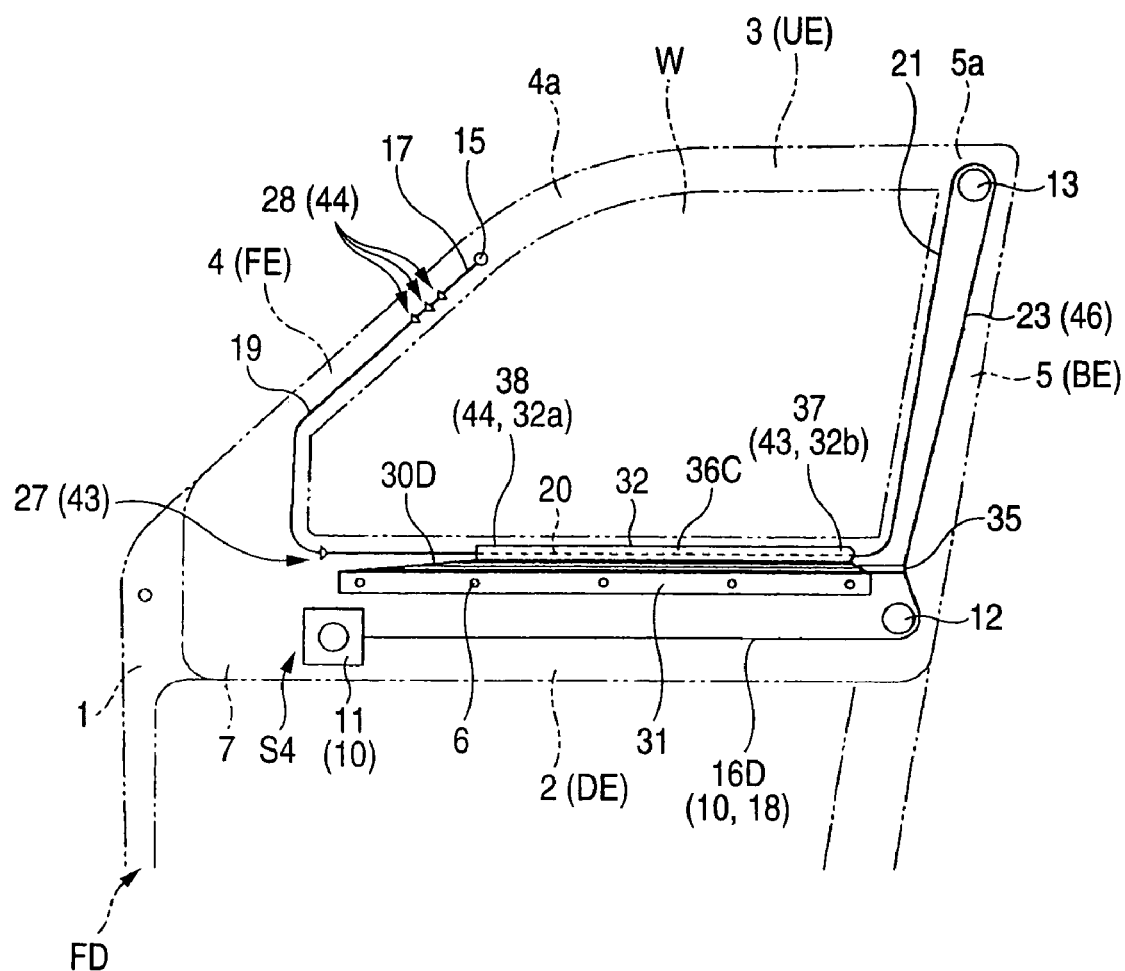
FIG. 16 is a schematic front view of an occupant protection apparatus of a fourth embodiment.
Figure 17A:
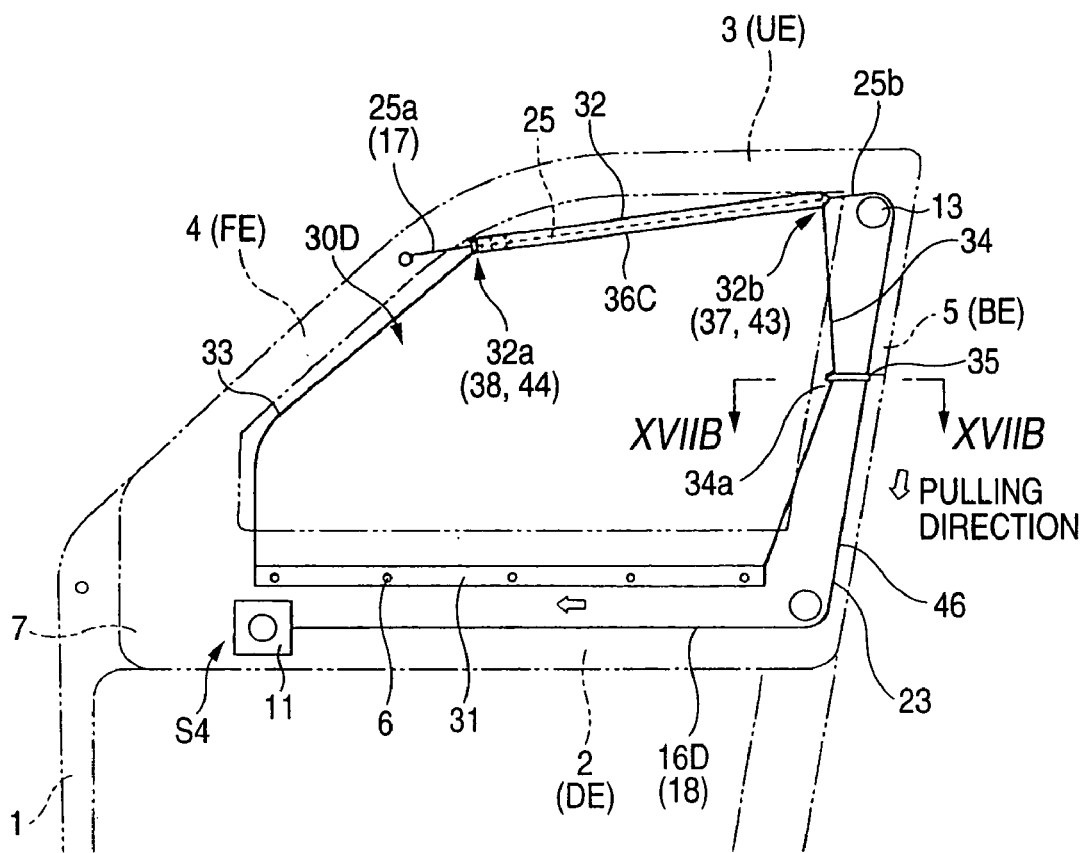
FIG. 17A is a schematic front view of the occupant protection apparatus of the fourth embodiment when the operation of the system is completed and FIG. 17B is a sectional view of the occupant protection apparatus of the fourth embodiment taking along the line XVIIB-XVIIB in FIG. 17A.
Figure 17B:
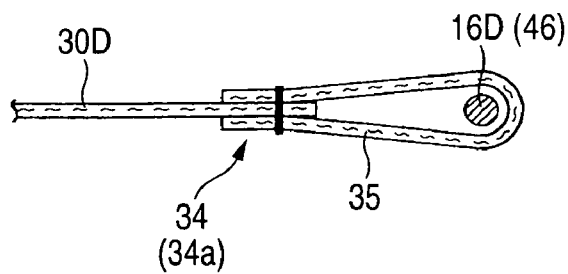

Furthermore, the occupant protection apparatus of the invention may be configured into an occupant protection apparatus S4 of a fourth embodiment shown in FIGS. 16, 17A, and 17B. In this fourth embodiment, a substantially vertical rod-like guide rail 46 is provided on at least either of a front edge and a rear edge of a peripheral edge of a side window W, in the case of this embodiment, on the edge which lies toward a rear edge 34. In addition, a locking portion 35 adapted to slidably lock on to the guide rail 46 is formed on either of front and rear edges of a cover sheet 30D which has deployed to cover the side window W, which is the rear edge 34 in this embodiment, so as to control the movement of the cover sheet 30D, which has deployed to cover the side window W, toward the center of the side window W.

In the case of this embodiment, a reversed portion 23 of a pulling string 16D which is wound round a support member 13 so as to reverse its pulling direction toward a free roller 12 is used as the guide rail 46. In addition, the locking portion 35 is provided on the cover sheet 30D at a vertically intermediate position 34a on the rear edge 34 of the cover sheet 30 which has deployed completely by bending a belt material formed of the same fabric material as the cover sheet 30D into a ring-like shape and sewing ends thereof together. A longitudinal lengthwise dimension of the locking portion is set such that when both a pulling operation of the pulling string 16D and a deployment operation of the cover sheet 30D are implemented together, the locking portion 35 can slide to rise along the guide rail 46 which is provided with the reversed portion 23 of the pulling string 16D, and when the cover sheet 30D has completed its deployment, the locking portion 35 can pull a portion of the rear edge 34 of the cover sheet 30D which lies in the vicinity of the vertically intermediate position 34a toward the guide rail 46 as much as possible so as not to allow the cover sheet 30D to move forward in such a state that the locking portion 35 is locked on the guide rail 46.

Note that the fourth embodiment differs from the third embodiment only in that the reversed portion 23 of the pulling string 16D is made use as the guide rail 46 and that the cover sheet 30D has the locking portion 35 provided on the rear edge 34 thereof so as to be slidably wound round the guide rail 46, and the other constituent portions and constituent components of the fourth embodiment are similar to those of the first to third embodiments, and hence like reference numerals are imparted to like portions and components to those of the first to third embodiments. In addition, the fourth embodiment is also installed on the vehicle as with the first embodiment.

In the occupant system S4 of the fourth embodiment, when it is activated, the same function and advantage as those of the third embodiment can be obtained. In addition thereto, when the cover sheet 30D has deployed completely, the rear edge 34 of the cover sheet 30D is allowed to lock on to the guide rail 46 by using the locking portion 35 so as to restrict the movement thereof toward the center of the side window W, and therefore, the reduction in area of the cover sheet which covers the window can be suppressed when and after the cover sheet has completely deployed to hold the occupant. Of course, when the cover sheet 30D deploys from the folded state, since the locking portion 35 can slide to rise over the guide rail 46, the cover sheet 30D can complete its deployment without any problem.

Figure 18:
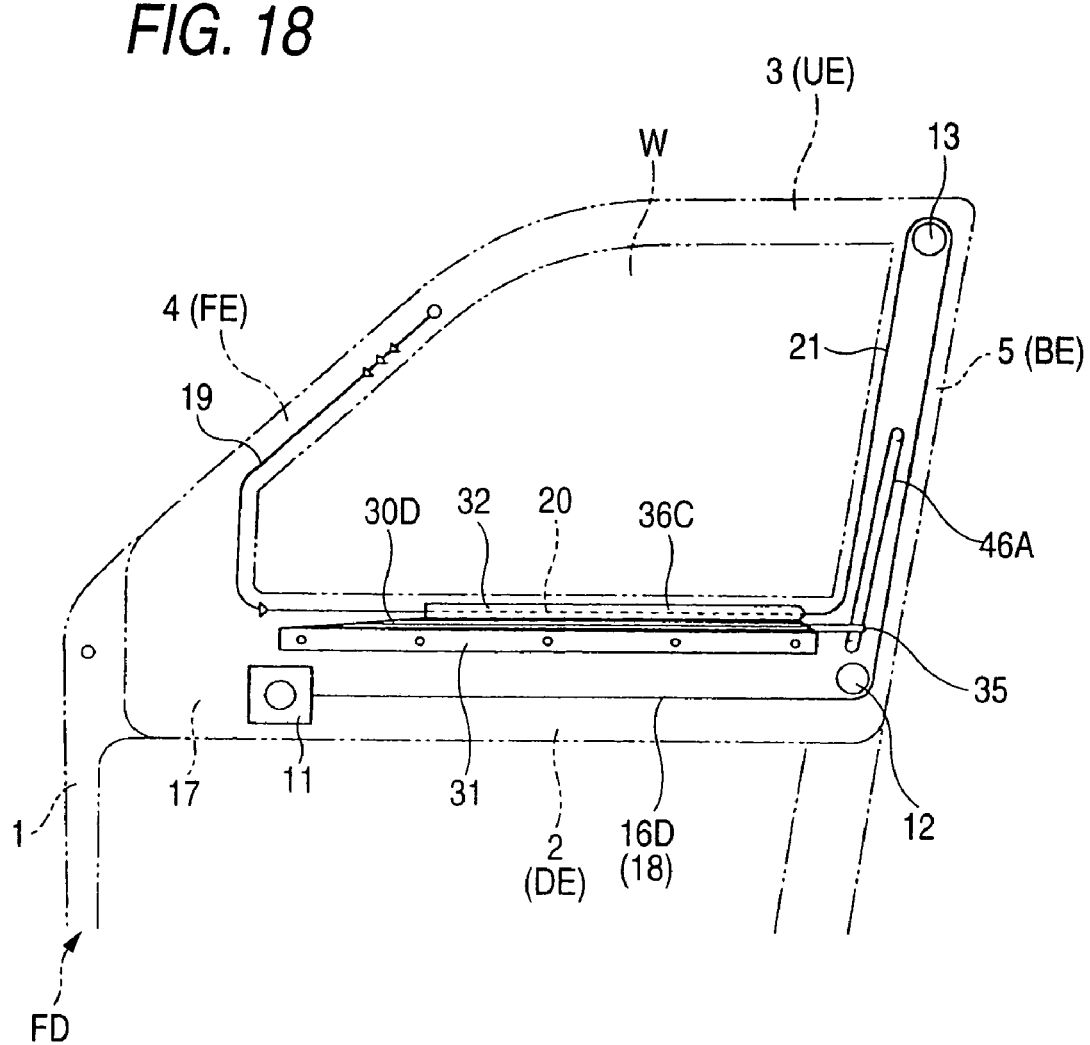
FIG. 18 is a schematic front view of a modified example made to the occupant protection apparatus of the fourth embodiment.
Figure 19A:
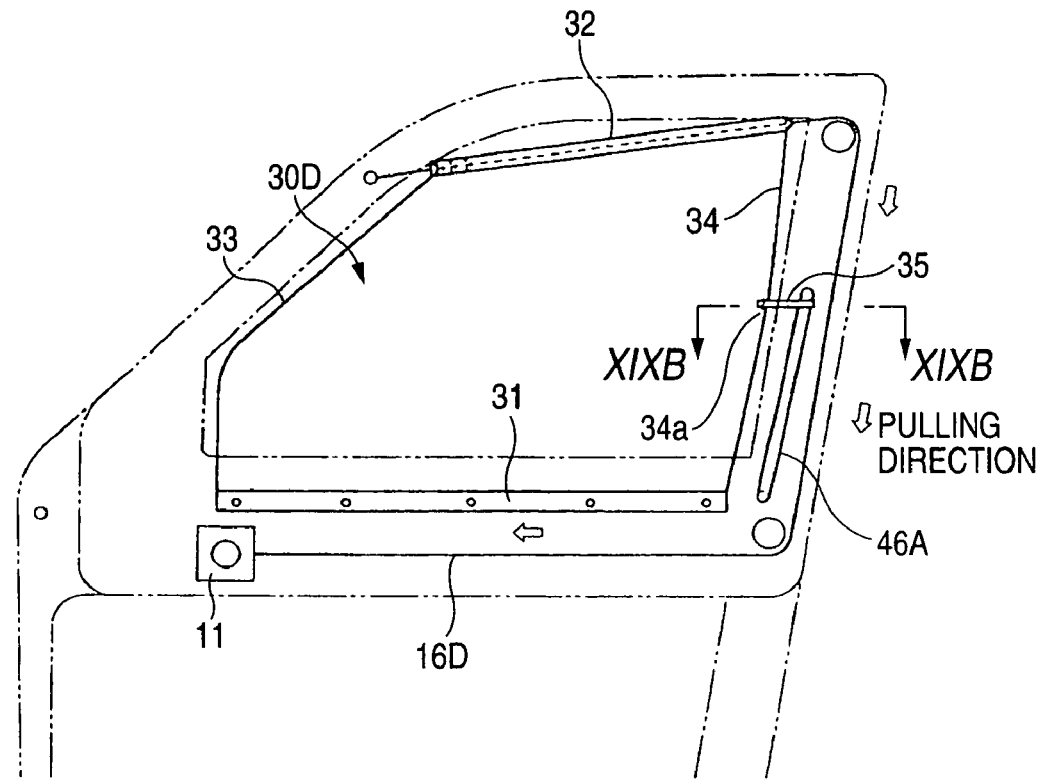
FIG. 19A is a schematic front view of the occupant protection apparatus shown in FIG. 18 when the operation of the system is completed and FIG. 19B is a sectional view taking along the line XIXB-XIXB in FIG. 19B.
Figure 19B:
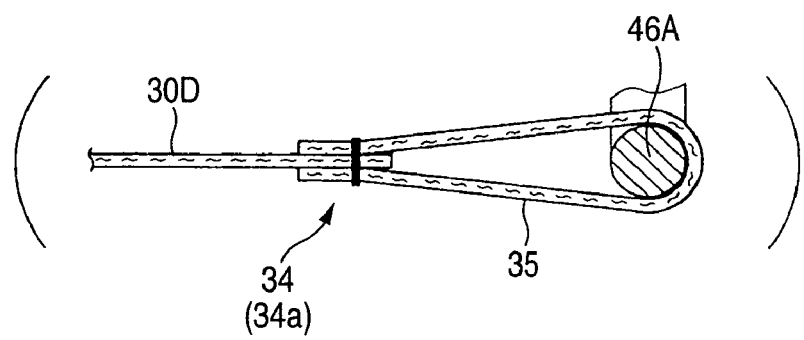

Note that the pulling string 16 does not have to be used for the guide rail which guides the locking portion 35 in the sliding fashion, but as shown in FIGS. 18, 19A and 19B, a substantially vertically extending rigid rod made of a metallic material may be provided separately on a rear frame portion 5 of a door frame 1 so as to form a guide rail (guide rod) 46A.

As with the fourth embodiment, however, in which the guide rail 46 is provided with the reversed portion 23 of the pulling string 16D which reverses its pulling direction at the support member 13 so as to extend in the reverse direction therefrom toward the free roller 12, compared to the case where the guide rail 46A is provided separately, the number of components can be reduced by such an extent that the rod-like guide rail 46A is not used. Incidentally, while the pulling string 16D has the flexibility, the portion (reversed portion) 23 of the pulling string 16D which reverses its pulling direction at the support member 13 so as to extend in the reverse direction therefrom toward the pulling device 11 produces tension when pulled, and hence, the reversed portion 23 becomes a rigid rod, whereby the reversed portion 23 can guide the locking portion 35 and restrict the movement of the locking portion 35 toward the center of the side window W in substantially the same way as done by the rod-like guide rail 46A which is made of a metallic rod or the like.

Note that while the fourth embodiment is described as the locking portion 35 being provided on the rear edge 34 of the cover sheet 30D so as to correspond to the guide rail 46, the guide rail and the locking portion may be provided on the front edge 33 of the cover sheet 30D. In this case, a guide rail 46 which is separate from the pulling string 16D is to be fixed to a front frame portion 4 of the door frame 1. Furthermore, guide rails and the locking portions may be provided on the front edge 33 and the rear edge 34 of the cover sheet 30D, respectively.

In addition, while the embodiments are described as the fixed end 17 of the pulling string 16, 16B, 16C, 16D being provided on the front edge portion FE of the peripheral edge of the side window W and the support member 13 being provided on the rear edge portion BE of the peripheral edge of the side window W, the positions of the fixed end 17 and the support member 13 may be reversed longitudinally.

Furthermore, the occupant protection apparatus of the invention may be configured into an occupant protection apparatus S5 of a fifth embodiment shown in FIGS. 20 to 23 in which as a pulling device 50 for pulling a pulling string 16E, the pulling amount thereof is increased to exceed a pulling stroke of a pretensioner 53 itself which acts as a pulling drive unit, so as to pull the pulling string 16E.

Figure 20:
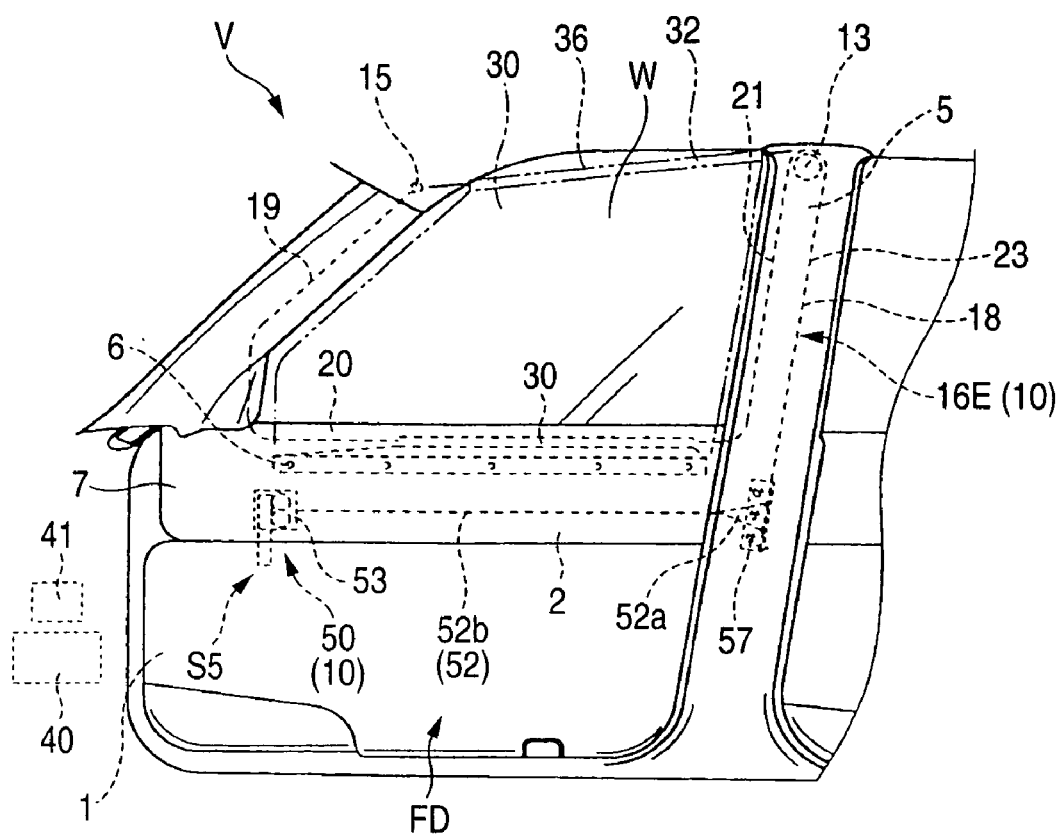
FIG. 20 is a schematic front view of an occupant protection apparatus of a fifth embodiment.
Figure 21:
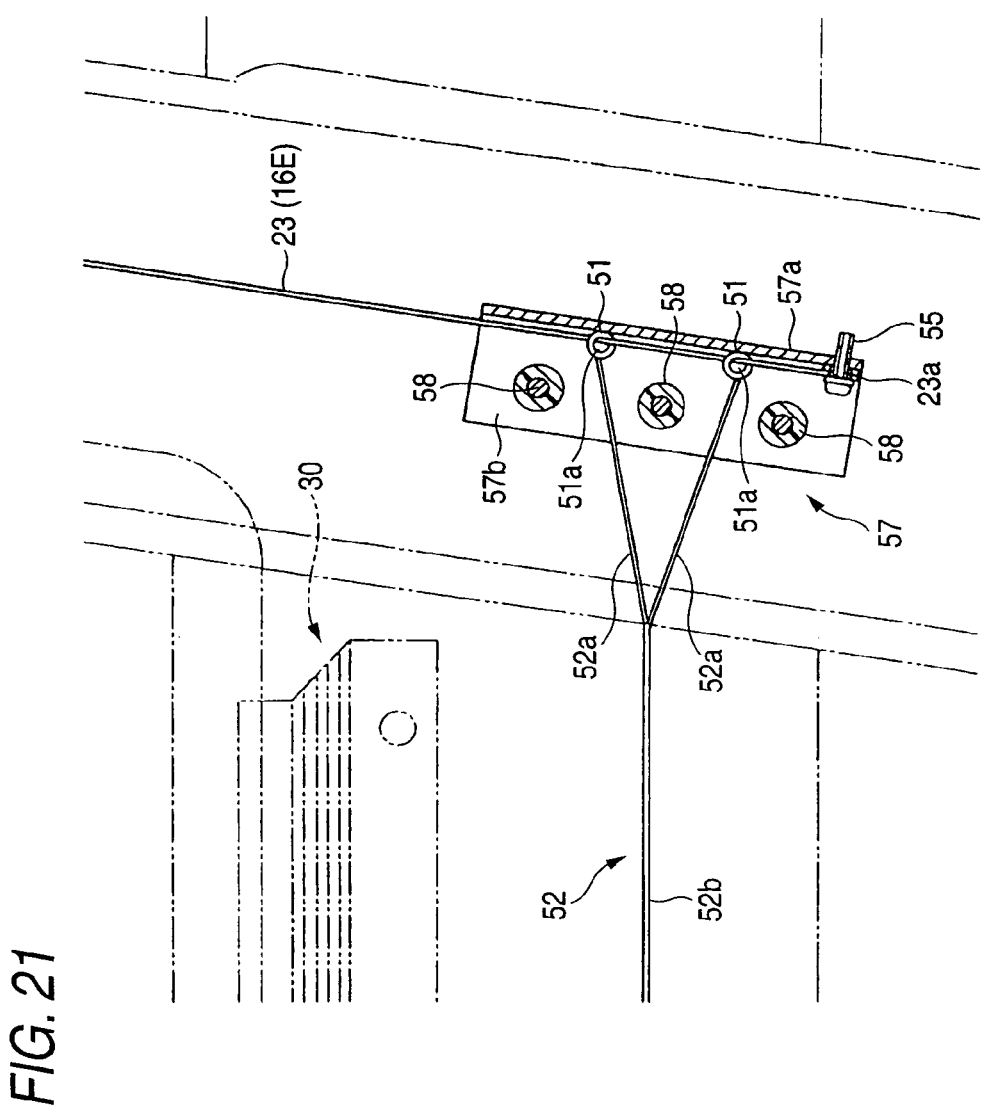
FIG. 21 is a partially enlarged view of a pulling device of the occupant protection apparatus of the fifth embodiment.

In this fifth embodiment, as shown in FIGS. 20 and 21, a lower end 23a of a reversed portion 23 of a proximal portion 18 part of the retractable member 16E which is reversed from a support member 13 is fastened to a housing 57 by means of a screw 55. The housing 57 is fixed to a lower frame portion 2 in a position below a rear frame portion 5 of a door frame 1 and is provided with a rear wall 57a which extends in a vertical direction and two side walls 57b which extend forward from left and right edges of the rear wall 57a so as to face each other. Then, the lower end 23a of the pulling string 16E is fixed to a lower end of a front side of the rear wall 57a using the screw 55. In addition, three rotatably support rollers 58 are provided to be arranged vertically between the side walls 57b on the housing 57 such that rotational axes thereof are oriented in the transverse direction of the vehicle.

In addition, the pulling device 50 is provided with the support member 13, the housing 57, the support rollers 58, pulling ring portions 51, a pulling arm portion and the pretensioner 53.

The pulling ring portion 51 is a portion to be connected to the pulling string 16E so as to pull the pulling string 16E and is provided in accordance with the number of gaps between the support rollers 58. In the case of this embodiment, two pulling ring portions 51 are used and are each formed into a loop having a sliding hole 51a through which the pulling string 16E is slidably passed. In addition, when the pulling arm portion 52 is pulled forward of the vehicle V, each pulling ring portion 51 allows the pulling string 16E to pass through each sliding hole 51a therein so that the reversed portion 23 part of the pulling string 16E is bent into a continuous angled shape between the corresponding support rollers 58 and itself, as shown in FIGS. 21 and 22, and is disposed between the support rollers 58.

The pulling arm portion 52 is formed a wiring material having flexibility such as a wire and is provided with a single main body portion 52b which extends toward the pretensioner 53 and two branched portions 52a which branch off the main body portion 52b. Each branched portion 52a holds the pulling ring portion 51.

In the case of the fifth embodiment, the pretensioner 53, which functions as a pulling drive unit, is provided with a piston cylinder which utilizes a small gas generator, and when activated, the pretensioner 53 is designed to pull in the main body portion 52b of the pulling arm portion 52 rapidly.

Figure 22:
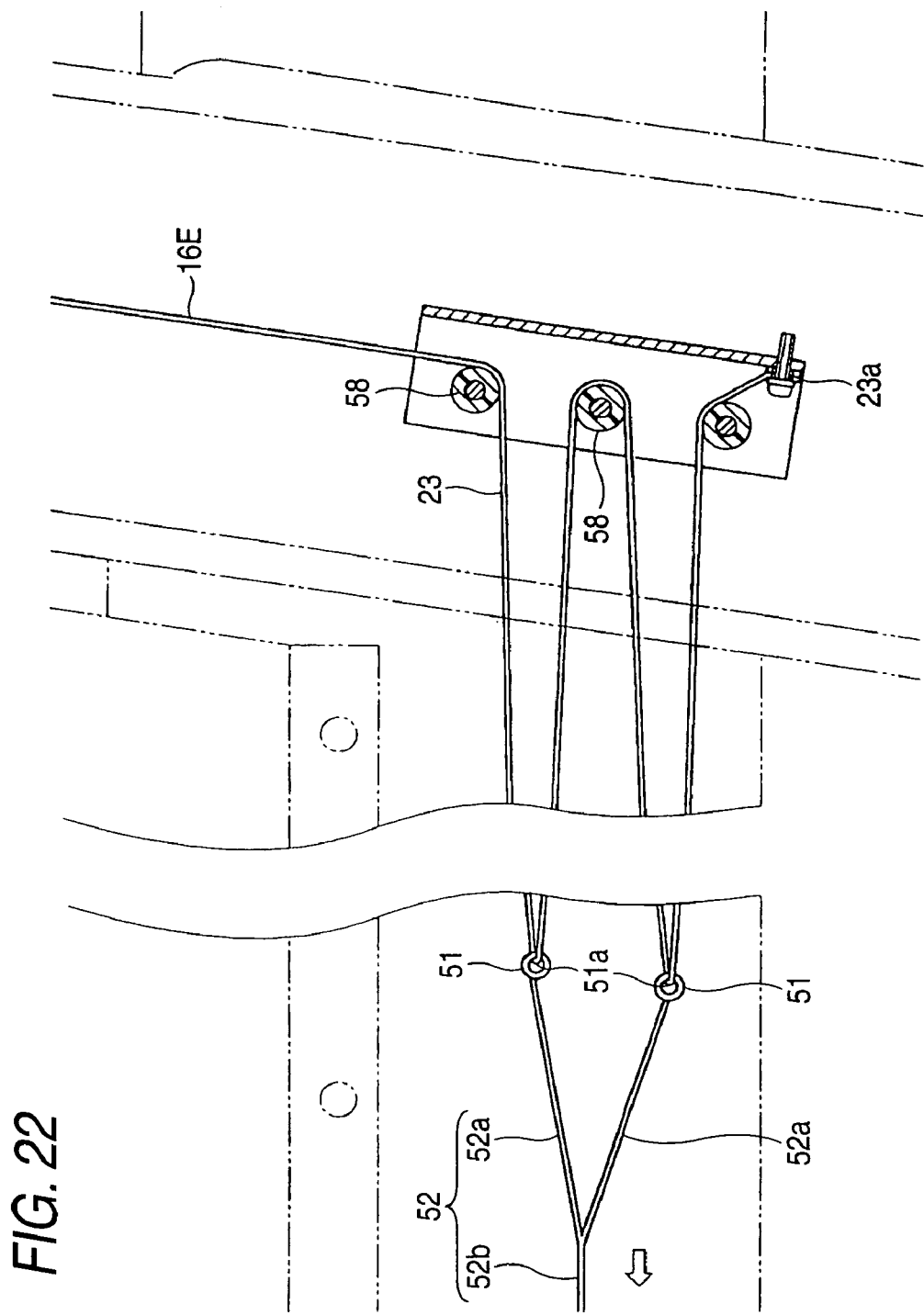
FIG. 22 is a partially enlarged view showing how the pulling device operates in the occupant protection apparatus of the fifth embodiment.
Figure 23:
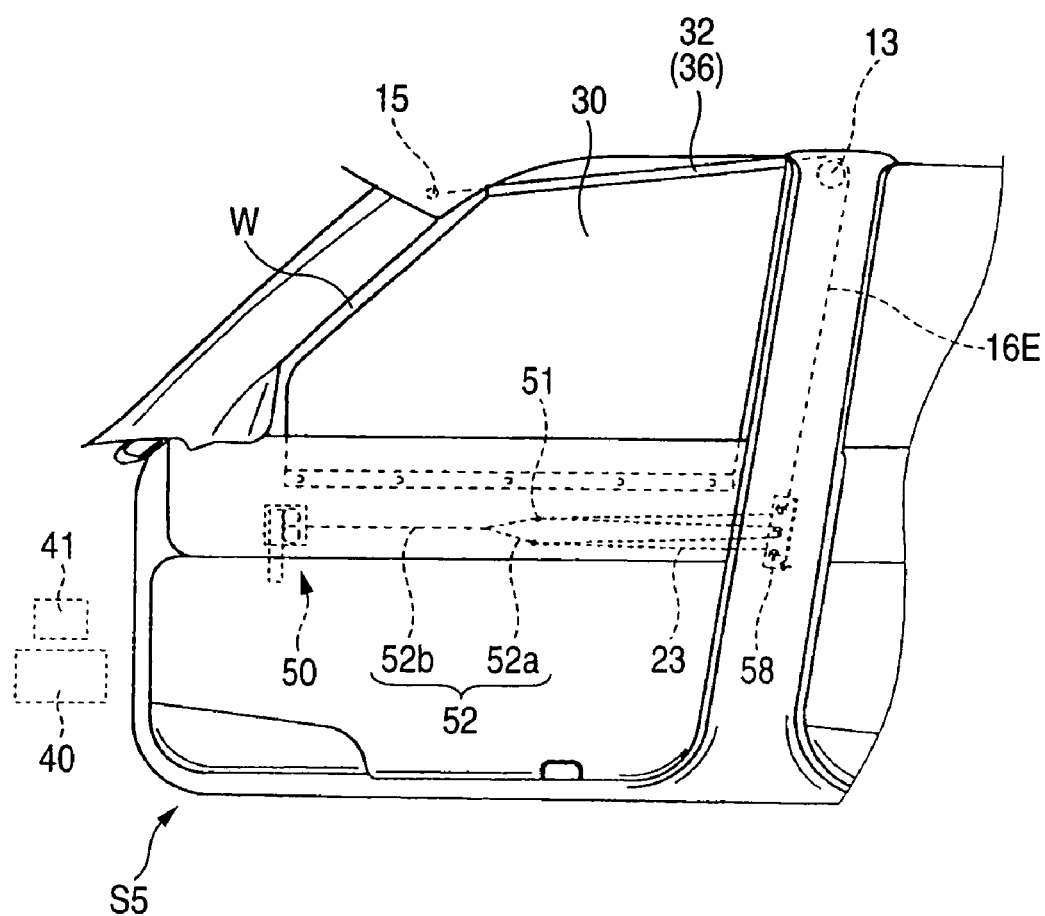
FIG. 23 is a schematic front view of the occupant protection apparatus of the fifth embodiment when the operation of the system is completed.

When the pulling device 50 is activated to operate, the pretensioner 53 pulls the pulling arm portion 52 forward as shown in FIGS. 22 and 23. Then, each branched portion 52a pulls the pulling string 16E over its moving stroke which is twice the moving stroke of the main body 52b which corresponds to the pulling stroke of the pretensioner 53, and since the pulling amount of the branched portion 52 is multiplied by the number of the branched portions 52a, the pulling string 16E is pulled by a resulting pulling stroke which is four times that of the main body portion 52b, whereby the cover sheet 30 is fed out to cover the side window W.

Figure 24:
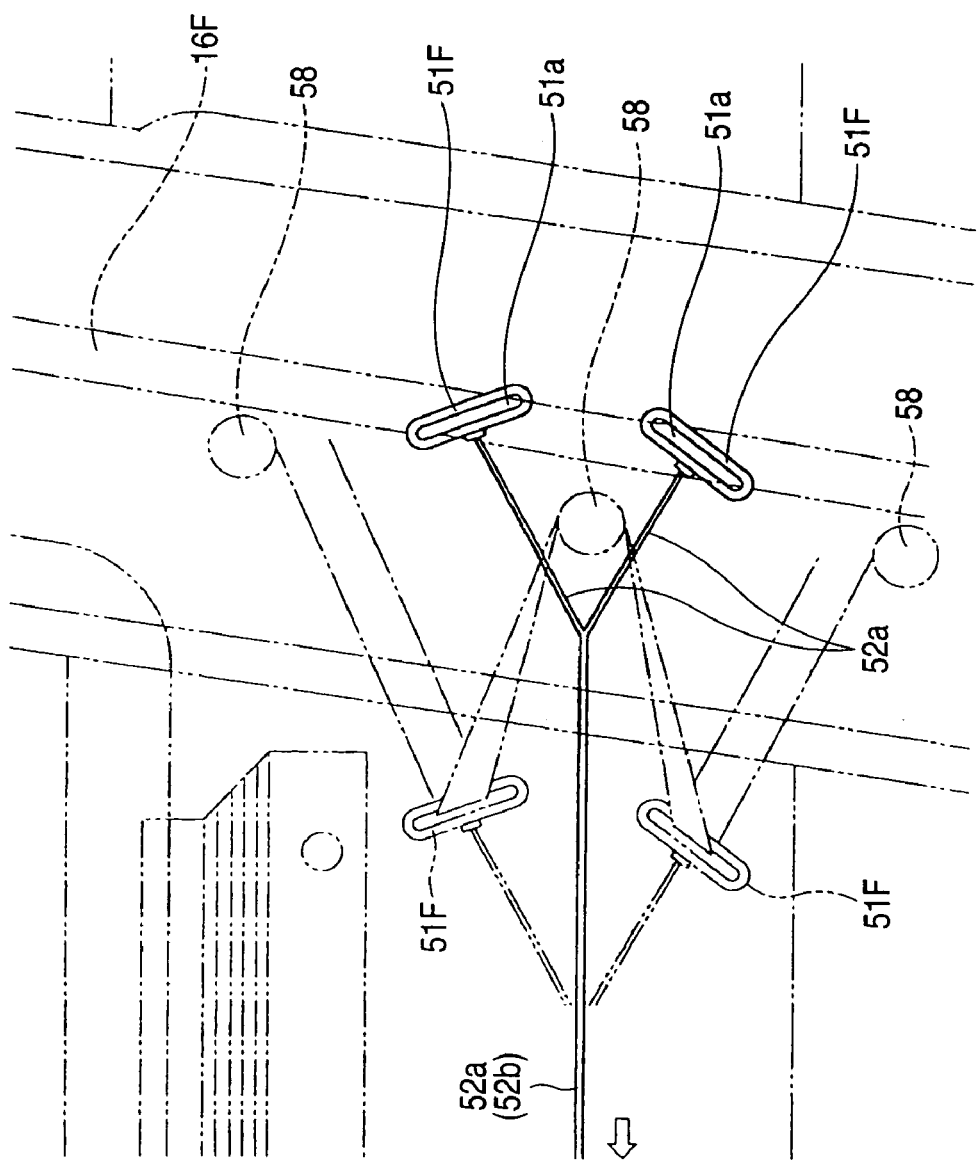
FIG. 24 is a partially enlarged view showing a modified example to the pulling device of the fifth embodiment.

In addition, in a case where a pulling string 16F is formed of a belt-like member, as shown in FIG. 24, a retractable ring portion 51F may be used which includes an elongated sliding hole 51a which corresponds to the belt-like shape of the pulling string 16F.

Figure 25:
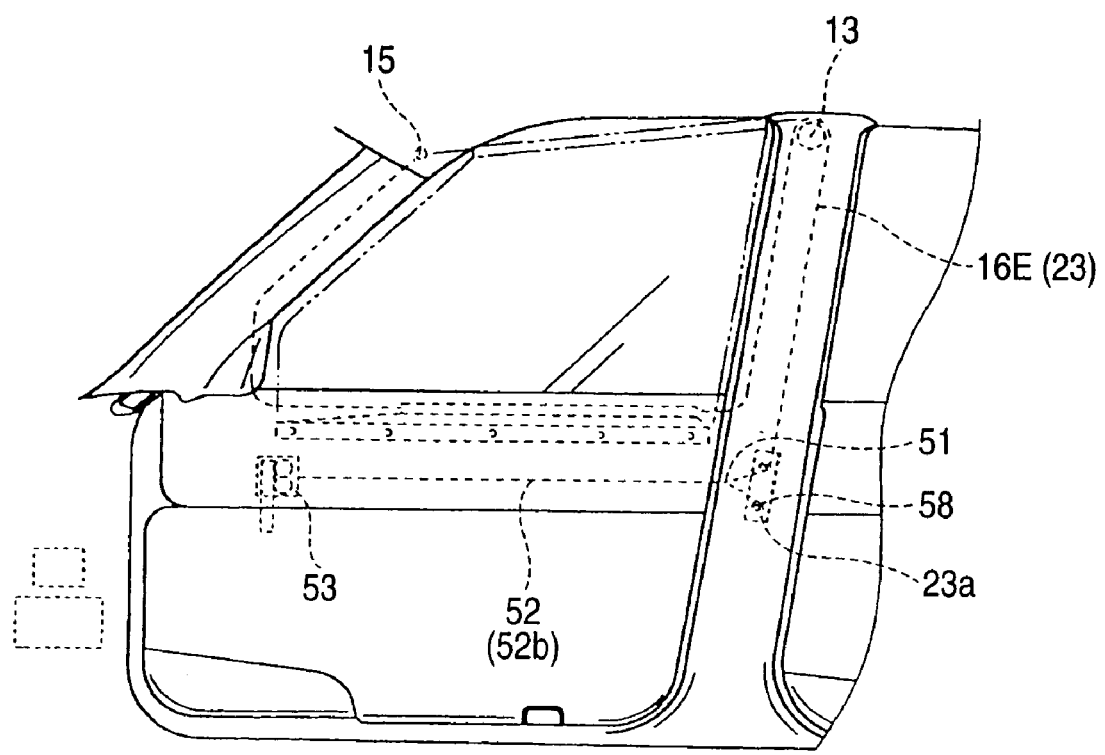
FIG. 25 is a schematic front view of a modified example to the occupant protection apparatus of the fifth embodiment.
Figure 26:
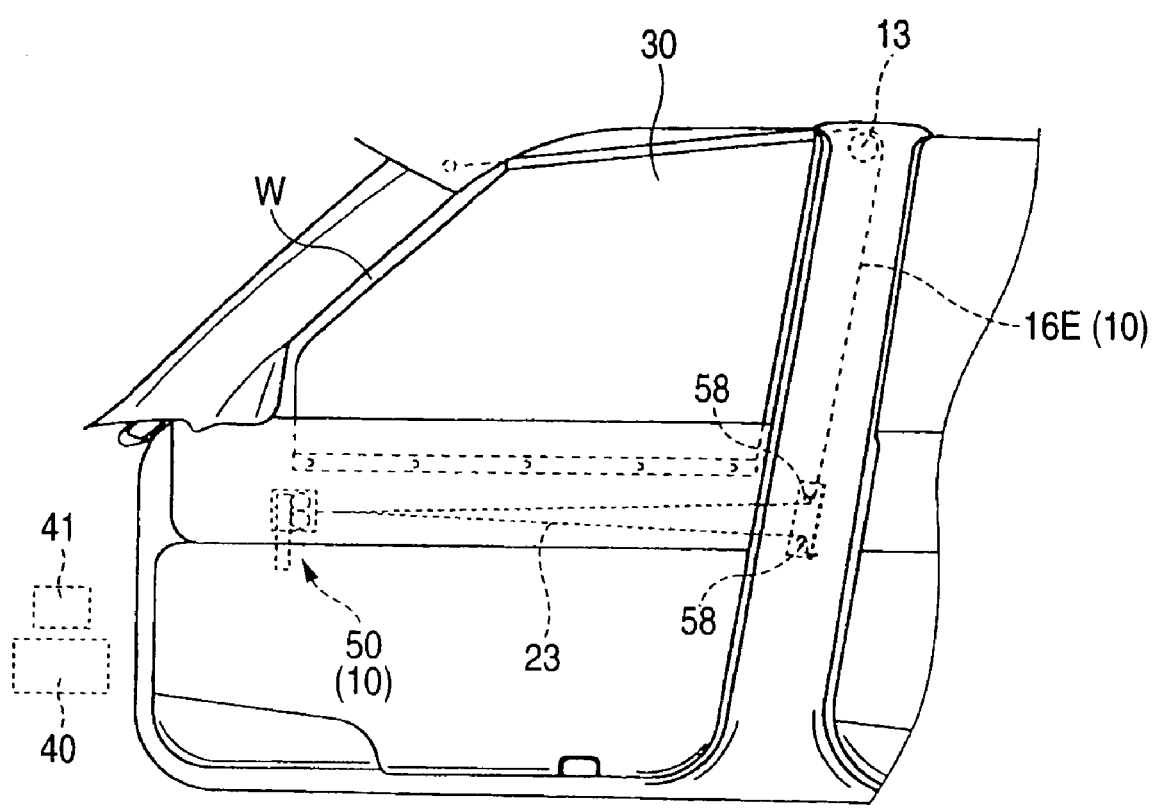
FIG. 26 is a schematic front view of the occupant protection apparatus shown in FIG. 25 when the operation of the system is completed.

Additionally, as with a modified example shown in FIGS. 25 and 26, two support rollers 58 are provided on the housing 57, and only a single pulling ring portion 51 is provided which is held on the main body portion 52b of the pulling arm portion 52, so that the pulling string 16E is pulled over a moving stroke which is twice the moving stroke of the main body portion 52b. Of course, the pulling amount may be enhanced to six times, eight times and the like by enhancing the numbers of the support rollers 58, pulling ring portions 52, and branched portions 52a correspondingly.

Furthermore, as with the fifth embodiment, when the pulling string 16E, 16F is pulled by a large pulling amount by increasing the pulling stroke of the pulling drive unit itself, a pulling device may be configured using pulleys and/or gears. In addition, the pulling device 50 such as the support rollers 58, the housing 57, and the pretensioner 53 as the pulling drive unit can be disposed not only in the in the vicinity of the position lying directly below the side window W as shown in the figures but also in various positions such as arranging positions lying further there below in consideration of arranging space.

In addition, while each embodiment is described as the occupant protection apparatus being installed in the front door FD, the occupant protection apparatus according to the invention may be installed in a peripheral edge of a rear door or a peripheral edge of a window of the vehicle which is not a door.

Furthermore, while each embodiment is described as the cover sheet 30, 30A, 30B, 30C, 30D being designed to be fed out when the vehicle turns over, the cover sheet 30, 30A, 30B, 30C, 30D may be designed to be fed out when the vehicle is involved in a sideways collision, and in such a case, the cover sheet is made to double as a head protection airbag which is folded to be accommodated in a roof side rail portion which lies on an upper edge portion of the side window W. Note that being supplied with an inflation gas which flows thereinto, this head protection airbag deploys and expands downward from the upper edge portion of the side window W so as to secure a cushioning function, so that the head portion of the occupant is protected when the vehicle is involved in a sideways collision.

What is claimed is:

1. An occupant protection apparatus adapted to cover a window in a vehicle, comprising:

a window peripheral edge including an upper edge portion and a lower edge portion, the window being defined between the lower edge portion and the upper edge portion of the window peripheral edge;

a cover sheet having an upper side part and a lower side part, for covering almost a whole area of the window, wherein the cover sheet is accommodated in the lower edge portion of the window peripheral edge such that the lower side part of the cover sheet as a stationary side is fixed substantially entirely along the lower edge portion of the window peripheral edge, and the upper side part of the cover sheet as a moving side to be pulled is located adjacent to the lower side part by folding the cover sheet; and a pulling unit including a pulling string having flexibility and a pulling device disposed below the window to pull the pulling string, wherein one end of the pulling string as a fixed end is fixed to a first side upper end portion of the window peripheral edge located on one of a front and rear sides of the window, another end of the pulling string as a proximal end is led to the pulling device through the lower edge portion of the window peripheral edge and a second upper end portion of the window peripheral edge located on the other of the front and rear sides of the window peripheral edge, and the pulling string is slidably guided around a support member provided at the second upper end portion of the window peripheral edge to reverse a pulling direction of the pulling string;

wherein when the pulling unit is activated, the pulling string is pulled to the pulling device to be linearly led between the first upper end portion and the second upper end portion, whereby the pulling string lifts the moving side of the cover sheet from the lower edge portion of the window peripheral edge top spread the cover sheet from the lower edge portion of the window to cover the window;

wherein the cover sheet includes a passageway portion through which the pulling string is slidably inserted in a vicinity of a front side and a rear side of the upper side part of the cover sheet, the passageway portion is accommodated before the pulling string is activated.

2. An occupant protection apparatus according to claim 1, wherein the upper side part of the cover sheet is formed into a tubular shape over a whole area from the front end to the rear end thereof, so as to constitute the passageway portion.

3. An occupant protection apparatus according to claim 1, wherein a stopper mechanism is provided on the upper side part of the cover sheet so that the passageway portion lies toward the support member as well as on the pulling string such that constituent parts of the stopper mechanism are brought into engagement with each other to prevent the upper side part of the cover sheet where the passageway portion is provided from returning back toward the fixed end of the pulling material when the cover sheet is completely deployed.

4. An occupant protection apparatus according to claim 3, wherein a height of the fixed end of the pulling string and a height of the support member is set such that the pulling string extending from the fixed end to the support member is kept farther away from the lower edge portion of the window peripheral edge at a support member end than at the fixed end thereof when the cover sheet is completely deployed, and wherein the cover sheet is set such that the upper side part moves away from the lower side part thereof so as to correspond to height-wise positions of the fixed end of the pulling string and the support member so set.

5. An occupant protection apparatus according to claim 3, wherein a secondary stopper mechanism is provided on the upper side part of the cover sheet so that the passageway portion lies toward the fixed end of the pulling string as well as the pulling string such that constituent parts of the secondary mechanism are brought into engagement with each other so as to prevent the upper side part of the cover sheet where the passageway portion is provided from moving toward the support member when the cover sheet is completely deployed.

6. An occupant protection apparatus according to claim 1, wherein a substantially vertically extending rod-like guide rail is provided on at least either of the front and rear sides of the window peripheral edge, and wherein the cover sheet includes a locking portion provided on either of front and rear edges thereof which corresponds to the guide rail when the cover sheet covers the window so as to slidably lock on to the guide rail so as to restrict the movement of the cover sheet toward a center of the window when the cover sheet covers the window.

7. An occupant protection apparatus according to claim 6, wherein the guide rail is provided with a portion of the pulling string which extends from the support member where the pulling string reverses its pulling direction toward the pulling device.

* * * * *